US012699599B2

(12) United States Patent
Higginson et al.

(10) Patent No.: US 12,699,599 B2
(45) Date of Patent: Aug. 4, 2026

(54) DYNAMIC SYSTEM WORKLOAD PLACEMENT IN CLOUD INFRASTRUCTURES

(71) Applicant: Oracle International Corporation, Redwood Shores, CA (US)

(72) Inventors: Antony Stephen Higginson, Cheshire (GB); Clive Bostock, Pickering (GB)

(73) Assignee: Oracle International Corporation, Redwood Shores (CA)

( * ) Notice: Subject to any disclaimer, the term of this patent is extended or adjusted under 35 U.S.C. 154(b) by 572 days.

(21) Appl. No.: 18/071,126

(22) Filed: Nov. 29, 2022

(65) Prior Publication Data

US 2023/0185472 A1 Jun. 15, 2023

Related U.S. Application Data

(60) Provisional application No. 63/284,528, filed on Nov. 30, 2021.

(51) Int. Cl.
G06F 9/50 (2006.01)
(52) U.S. Cl.
CPC ............ G06F 9/5088 (2013.01); G06F 9/505 (2013.01); G06F 9/5083 (2013.01)
(58) Field of Classification Search
CPC ...... G06F 9/5088; G06F 9/505; G06F 9/5083; G06F 9/5077
See application file for complete search history.

(56) References Cited

U.S. PATENT DOCUMENTS

| 6,889,210 B1 | 5/2005 | Vainstein |
| 7,693,983 B1 | 4/2010 | Gupta et al. |
| 7,865,584 B2 | 1/2011 | Grossner et al. |
| 7,913,056 B2 | 3/2011 | Brown et al. |

(Continued)

FOREIGN PATENT DOCUMENTS

| EP | 3772687 A1 | 2/2021 |
| WO | 2014032262 A1 | 3/2014 |

OTHER PUBLICATIONS

U.S. Appl. No. 13/937,885, Advisory Action mailed on Jul. 31, 2019, 17 pages.

(Continued)

*Primary Examiner* — Sisley N Kim
(74) *Attorney, Agent, or Firm* — Mughal Gaudry & Franklin PC

(57) ABSTRACT

Systems, methods, and machine-readable media may place workloads of source systems in a migration of data and applications from the source systems to target systems. Data relating to a first number of source nodes and a second number of target nodes may be received and analyzed. A migration plan that specifies placement of workloads from source systems into target systems may be created. The placement may include packing a pluggable environment or a clustered environment. The packing the pluggable environment or the clustered environment may include: when the second number of target nodes is greater than the first number of source nodes, placing workload from the source nodes to the target nodes; and, when the second number of target nodes is less than the first number of source nodes, the workload from the source nodes is not placed to the target nodes.

20 Claims, 16 Drawing Sheets

(56) References Cited

U.S. PATENT DOCUMENTS

| | | | | |
|---|---|---|---|---|
| 8,059,565 | B2 | 11/2011 | Dholakia et al. | |
| 8,255,516 | B1 * | 8/2012 | Zhang | H04L 67/10 |
| | | | | 709/224 |
| 9,811,527 | B1 | 11/2017 | Esposito et al. | |
| 10,404,579 | B1 * | 9/2019 | Biemueller | H04L 41/0803 |
| 11,157,664 | B2 | 10/2021 | Higginson et al. | |
| 2006/0173875 | A1 | 8/2006 | Stefaniak | |
| 2006/0282825 | A1 | 12/2006 | Taylor | |
| 2007/0250829 | A1 | 10/2007 | Hillier et al. | |
| 2008/0010233 | A1 | 1/2008 | Sack et al. | |
| 2008/0148345 | A1 | 6/2008 | Rubio | |
| 2009/0048993 | A1 | 2/2009 | Lohrbach et al. | |
| 2009/0070771 | A1 | 3/2009 | Yuyitung et al. | |
| 2009/0157864 | A1 | 6/2009 | Kim | |
| 2009/0276771 | A1 | 11/2009 | Nickolov et al. | |
| 2011/0107327 | A1 | 5/2011 | Barkie et al. | |
| 2012/0030407 | A1 | 2/2012 | Pandey et al. | |
| 2015/0019197 | A1 | 1/2015 | Higginson et al. | |
| 2015/0026153 | A1 | 1/2015 | Gupta et al. | |
| 2015/0302016 | A1 | 10/2015 | Nam et al. | |
| 2015/0363396 | A1 | 12/2015 | Sengupta et al. | |
| 2016/0094477 | A1 | 3/2016 | Bai et al. | |
| 2017/0315838 | A1 * | 11/2017 | Nidugala | H04L 43/0817 |
| 2018/0026913 | A1 * | 1/2018 | Balle | G06F 1/183 |
| 2018/0143852 | A1 * | 5/2018 | Ballantyne | G06F 9/5072 |
| 2018/0157653 | A1 | 6/2018 | Wadhwa et al. | |
| 2018/0285353 | A1 | 10/2018 | Ramohalli Gopala Rao et al. | |
| 2019/0121786 | A1 | 4/2019 | Zhou et al. | |
| 2019/0235922 | A1 * | 8/2019 | Iovanna | G06F 9/5088 |
| 2020/0336464 | A1 | 10/2020 | Hastings | |
| 2023/0112031 | A1 * | 4/2023 | Watson-Jones | G06F 9/5044 |
| | | | | 718/105 |

OTHER PUBLICATIONS

U.S. Appl. No. 13/937,885, Final Office Action mailed on May 19, 2017, 22 pages.

U.S. Appl. No. 13/937,885, Final Office Action mailed on Mar. 21, 2019, 23 pages.

U.S. Appl. No. 13/937,885, Final Office Action mailed on Feb. 4, 2021, 25 pages.

U.S. Appl. No. 13/937,885, Non-Final Office Action mailed on Aug. 10, 2018, 23 pages.

U.S. Appl. No. 13/937,885, Non-Final Office Action mailed on Jul. 29, 2020, 24 pages.

U.S. Appl. No. 13/937,885, Non-Final Office Action mailed on Aug. 18, 2016, 32 pages.

U.S. Appl. No. 13/937,885, Notice of Allowance mailed on Jun. 16, 2021, 9 pages.

U.S. Appl. No. 13/937,885, Supplemental Notice of Allowability mailed on Jun. 28, 2021, 2 pages.

U.S. Appl. No. 17/580,196, Non-Final Office Action mailed on Dec. 23, 2022, 26 pages.

International Application No. PCT/US2022/051208, International Search Report and the Written Opinion mailed on Feb. 24, 2023, 12 pages.

Pernul et al., The Entity-Relationship Model for Multilevel Security, In International Conference on Conceptual Modeling, Springer, Dec. 1993, pp. 166-177.

Siegel et al., Building Flexible, Extensible Tools for Metadatabase Integration, Available Online at: https://dspace.mit.edu/bitstream/handle/1721.1/46945/buildingflexible00sieg.pdf?sequence=1, Nov. 1991, 22 pages.

Higginson et al., DBaaS Cloud Capacity Planning—Accounting for Dynamic RDBMS Systems that Employ Clustering and Standby Architectures, Available Online at: https://openproceedings.org/2017/conf/edbt/paper-12.pdf, 2017, pp. 687-698.

Oracle Database High Availability Overview and Best Practices, Available Online at: https://web.archive.org/web/20210720191300if_/https://docs.oracle.com/en/database/oracle/oracle-database/19/haovw/high-availability-overview-and-best-practices.pdf, Apr. 2021, 195 pages.

AWS Database Migration Service Step-by-Step Migration Guide, Available Online at: https://web.archive.org/web/20210722054648if_/https://docs.aws.amazon.com/dms/latest/sbs/dms-sbs.pdf, Jan. 1, 2016, 172 pages.

Introduction to Zero Downtime Migration, Available Online at: https://web.archive.org/web/20210925195003/https://docs.oracle.com/en/database/oracle/zero-downtime-migration/19.2/zdmug/introduction-to-zero-downtime-migration.html#GUID-A4EC1775-307C-47A6-89FB-E4C3F1FBC4F5, 2021, 7 pages.

Oracle Enterprise Manager, Available Online at: https://www.oracle.com/a/ocom/docs/enterprise-manager/oracle-enterprise-manager-solution-brief.pdf, Jan. 13, 2020, 8 pages.

Higginson et al., Database Workload Capacity Planning using Time Series Analysis and Machine Learning, Proceedings of the 2020 ACM SIGMOD International Conference on Management of Data, 2020, pp. 769-783.

International Preliminary Report on Patentability for International Application No. PCT/US2022/051208, dated Jun. 13, 2024.

Preliminary Opinion before Oral Proceedings for European Patent Application No. 22831033.0, dated Mar. 6, 2026.

Wikipedia, "Bin packing problem—Wikipedia", Nov. 26, 2021, retrieved from the internet at: https://en.wikipedia.org/w/index.php?title=Bin_packing_problem&oldid=1057237841.

Wikipedia, "First-fit-decreasing bin packing", Oct. 4, 2021, retrieved from the internet at https://en.wikipedia.org/w/index.php?title=First-fit-decreasing_bin_packing&oldid=1048184229.

\* cited by examiner

CPU Usage: Complex data structures.

Real Application (RAC)
High Availability (MAA) Workloads
510-1

PDBs
905

Root

CDB

Database Multitenant Architecture
900

Nodes: Resource Capacity
1100

Workloads: Resource Demand
1200

DYNAMIC SYSTEM WORKLOAD PLACEMENT IN CLOUD INFRASTRUCTURES

CROSS REFERENCE TO RELATED APPLICATION

This application is a non-provisional of and claims priority to U.S. Provisional Patent Application No. 63/284,528, filed Nov. 30, 2021, which is incorporated by reference herein for all purposes.

TECHNICAL FIELD

This disclosure generally relates to systems and methods of system workload placement, and more particularly to systems and methods for dynamic system workload placement in cloud infrastructures.

BACKGROUND

Capacity planning is an essential activity in the procurement and daily running of any multi-server computer system. Workload placement is a well-known problem, and there are several solutions to help address capacity planning problems of knowing where, when, and how much resource is needed to place workloads of varying shapes (resources consumed). Bin-packing algorithms may be used extensively in addressing workload placement problems.

However, conventional workload placement is fraught with numerous problems and challenges. For example, inaccuracies and inefficiencies may result from: manual building of spreadsheets that are cumbersome and fail to avoid errors in calculations; conversion of chipsets using benchmarks (e.g., SPECInt, M-Values benchmarks), which require complicated spreadsheet conversions; complicated spreadsheets that only architects can understand; low automation, which requires days/weeks to complete a design/plan when an algorithm can place workloads by interrogating repositories; bespoke rather than standardized spreadsheets; insecurities as placement specifications and designs are not stored in a secured and auditable cloud repository; etc. Such problems may affect various types of services, such as consolidation-type services where systems are merging or reducing server sprawl using multitenant architecture, managed cloud services where workloads are already placed or have been scoped, any cloud product where workloads are consolidated, and/or the like. Moreover, current bin-packing algorithms do not take into consideration systems that employ High Availability (HA) such as clustering and often treat a workload in a singular fashion, as opposed to a workload made up of 'sibling' workloads.

Thus, there is a need for systems and methods that address complexities, increase efficiencies, decrease errors, increase speeds, and otherwise improve database or application workloads placement. These and other needs are addressed by the present disclosure.

BRIEF SUMMARY

Embodiments of the present disclosure relate generally to systems and methods of system workload placement, and more particularly to systems and methods for dynamic system workload placement in cloud infrastructures.

In one aspect, a system to place workloads of one or more source systems in a migration of data and/or applications from the one or more source systems to one or more target systems is disclosed. The system may include one or more processing devices and memory communicatively coupled with and readable by the one or more processing devices, the memory including processor-readable instructions which, when executed by the one or more processing devices, cause the one or more processing devices to perform operations that may include one or a combination of the following. Data relating to a first number of source nodes and a second number of target nodes may be received. The migration infrastructure may be located remotely from the first number of source nodes and may be configured to provide a migration service. The data relating to the first number of source nodes and the second number of target nodes may be analyzed. A migration plan that specifies placement of workloads from one or more source systems into one or more target systems may be created. The placement may include packing a pluggable environment or a clustered environment. The packing the pluggable environment or the clustered environment may include: when the second number of target nodes is greater than the first number of source nodes, placing workload from the source nodes to the target nodes; and, when the second number of target nodes is less than the first number of source nodes, the workload from the source nodes is not placed to the target nodes, and one or more rollback operations may be executed. Execution of a migration according to the migration plan may be caused. The migration may include placing the workload from the source nodes to the target nodes when the second number of target nodes is greater than the first number of source nodes.

In another aspect, a method to place workloads of one or more source systems in a migration of data and/or applications from the one or more source systems to one or more target systems is disclosed. The method may include one or a combination of the following. Data relating to a first number of source nodes and a second number of target nodes may be received by a migration infrastructure. The migration infrastructure may be located remotely from the first number of source nodes and may be configured to provide a migration service. The data relating to the first number of source nodes and the second number of target nodes may be analyzed by the migration infrastructure. A migration plan that specifies placement of workloads from one or more source systems into one or more target systems may be created by the migration infrastructure. The placement may include packing a pluggable environment or a clustered environment. The packing the pluggable environment or the clustered environment may include: when the second number of target nodes is greater than the first number of source nodes, placing workload from the source nodes to the target nodes; and, when the second number of target nodes is less than the first number of source nodes, the workload from the source nodes is not placed to the target nodes, and one or more rollback operations may be executed. Execution of a migration according to the migration plan may be caused by the migration infrastructure. The migration may include placing the workload from the source nodes to the target nodes when the second number of target nodes is greater than the first number of source nodes.

In yet another aspect, one or more non-transitory, machine-readable media are disclosed as having machine-readable instructions thereon which, when executed by one or more processing devices, cause the one or more processing devices to perform operations that may include one or a combination of the following. Data relating to a first number of source nodes and a second number of target nodes may be received. The migration infrastructure may be located remotely from the first number of source nodes and may be configured to provide a migration service. The data relating to the first number of source nodes and the second number of target nodes may be analyzed. A migration plan that specifies placement of workloads from one or more source systems into one or more target systems may be created. The placement may include packing a pluggable environment or a clustered environment. The packing the pluggable environment or the clustered environment may include: when the second number of target nodes is greater than the first number of source nodes, placing workload from the source nodes to the target nodes; and, when the second number of target nodes is less than the first number of source nodes, the workload from the source nodes is not placed to the target nodes, and one or more rollback operations may be executed. Execution of a migration according to the migration plan may be caused. The migration may include placing the workload from the source nodes to the target nodes when the second number of target nodes is greater than the first number of source nodes.

In various embodiments, the one or more target systems may correspond to a cloud infrastructure, and the placement of the workloads may correspond to placing the workloads in the cloud infrastructure. In various embodiments, the operations and method may be scalable so that the placement of the workloads may be based at least in part on one or more dimensions that can increase a vector. In various embodiments, the vector may include dimensions of metrics that correspond to one or more of an input/output (IO) metric, a central processing unit (CPU) metric, and/or a memory metric. In various embodiments, the vector may be a function of time. In various embodiments, a consolidated time series data signal corresponding to the workloads may be obtained. The consolidated time series data signal may be analyzed, and the consolidated time series data signal may be compared with a sum of a target bin to determine whether further efficiencies can be obtained by elasticization to reduce wastage. In various embodiments, the target bin may be elasticized. The target bin may correspond to node of a cloud configuration. In various embodiments, the migration service may be cloud-based.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of embodiments according to the present disclosure may be realized by reference to the remaining portions of the specification in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments according to the present disclosure may provide for systems, methods, and non-transitory media for dynamic database workload placement in cloud infrastructures. Various embodiments may work for any workload that consumes a shape of resources that make a vector. A vector may be any shape of metrics such as input/output (IO) metrics (e.g., input/output operations per second (IOPS)), memory metrics (e.g., memory utilization), central processing unit (CPU) (e.g., CPU utilization), and the like including metrics that apply to applications at the PaaS, SaaS, and DBaaS layers of cloud computing. Various embodiments may also include on-premises architectures, such as N-Tier.

Figure 1:
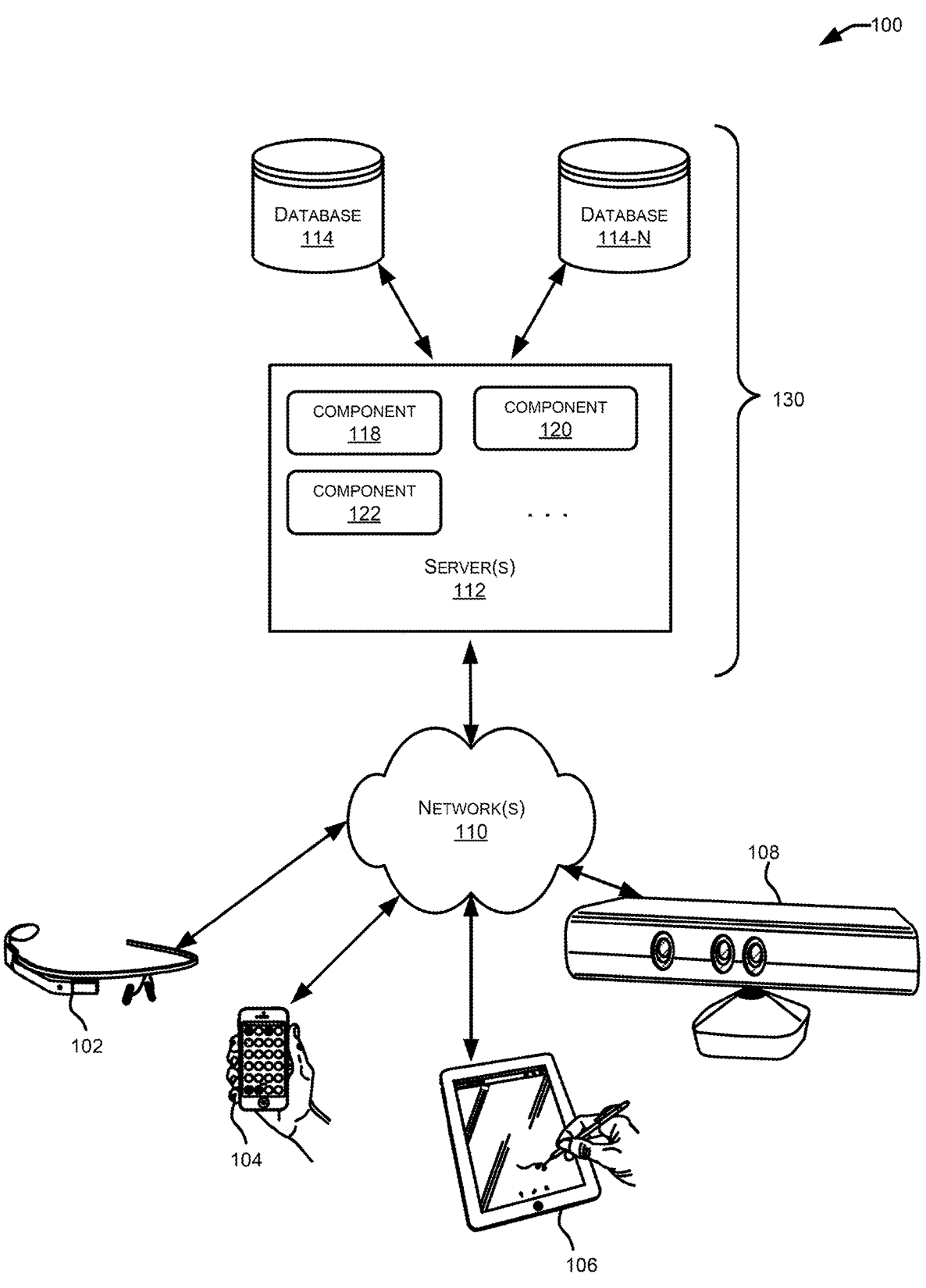
FIG. 1 illustrates depicts a simplified diagram of a distributed system, in accordance with disclosed embodiments according to the present disclosure.

Various embodiments will now be disclosed in greater detail with reference to the accompanying figures, beginning with FIG. 1. FIG. 1 depicts a simplified diagram of a distributed system 100 for implementing disclosed embodiments in accordance with present disclosure. The selection and/or arrangement of components depicted in FIG. 1 are shown only by way of example and are not meant to be limiting. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114. Databases 114 may reside in a variety of locations. By way of example, one or more of databases 114 may reside on a non-transitory storage medium local to (and/or resident in) server 112. Alternatively, databases 114 may be remote from server 112 and in communication with server 112 via a network-based or dedicated connection. In various embodiments, databases 114 may reside in a storage-area network (SAN), NAS (Network Attached Storage), or cloud storage capabilities, such as block, file, or object storage. Similarly, any necessary files for performing the functions attributed to server 112 may be stored locally on server 112 and/or remotely, as appropriate. In one set of embodiments, databases 114 may include relational databases, such as databases provided by Oracle, that are adapted to store, update, and retrieve data in response to SQL-formatted commands.

Figure 2:
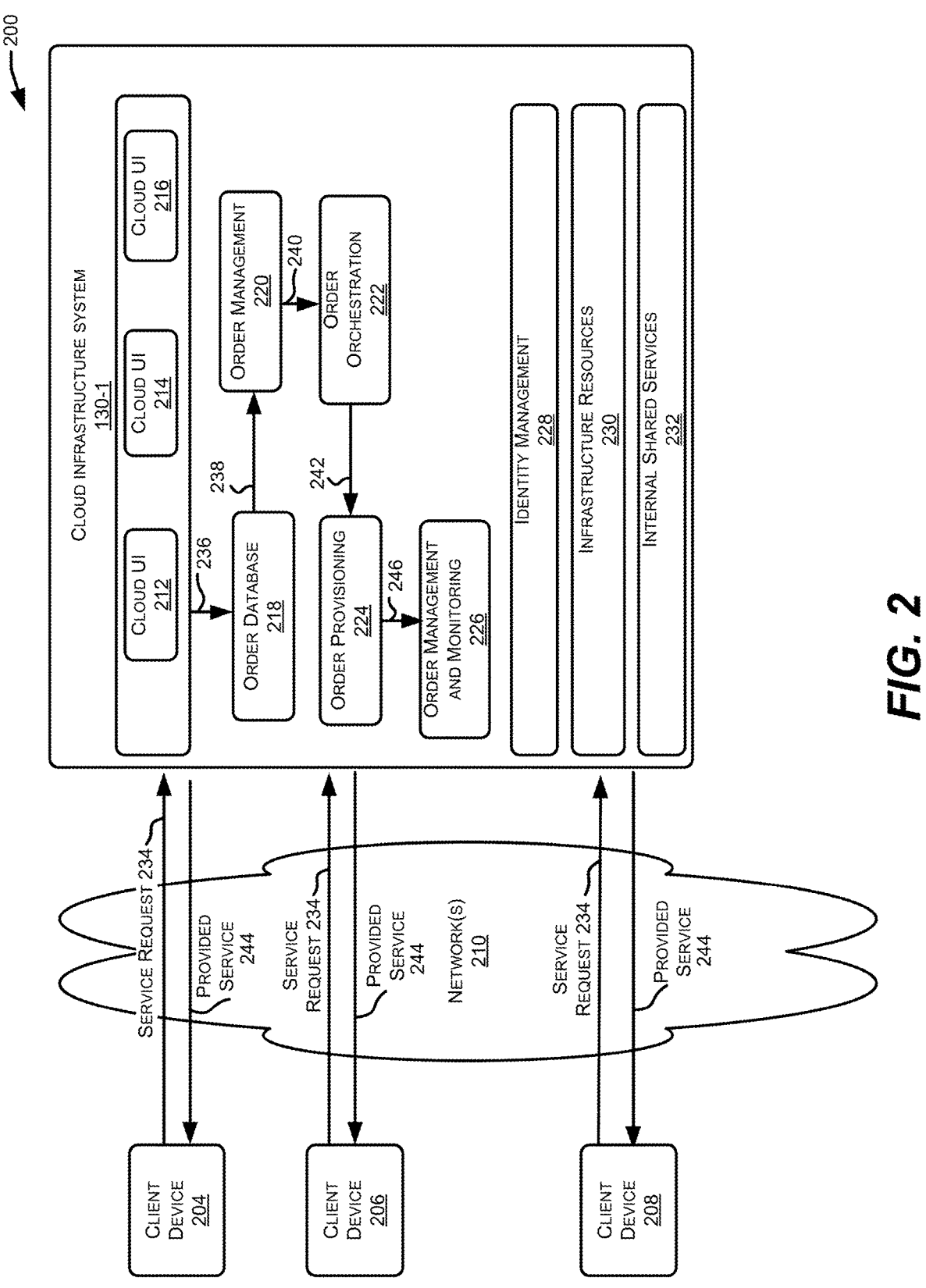
FIG. 2 illustrates simplified block diagram of one or more components of a system environment by which services provided by one or more components of a system may be offered as cloud services, in accordance with disclosed embodiments according to the present disclosure.

FIG. 2 is a simplified block diagram of one or more components of a system environment 200 by which services provided by one or more components of a system may be offered as cloud services, in accordance with certain embodiments of the present disclosure. In the illustrated embodiment, system environment 200 includes one or more client computing devices 204, 206, and 208 that may be used by users to interact with a cloud infrastructure system 130-1 that provides cloud services. The client computing devices may be configured to operate a client application such as a web browser, a proprietary client application (e.g., Oracle Forms), or some other application, which may be used by a user of the client computing device to interact with cloud infrastructure system 130-1 to use services provided by cloud infrastructure system 130-1.

It should be appreciated that cloud infrastructure system 130-1 depicted in the figure may have other components than those depicted. Further, the embodiment shown in the figure is only one example of a cloud infrastructure system that may incorporate an embodiment of the invention. In some other embodiments, cloud infrastructure system 130-1 may have more or fewer components than shown in the figure, may combine two or more components, or may have a different configuration or arrangement of components.

Client computing devices 204, 206, and 208 may be devices similar to those described above for 102, 104, 106, and 108. Although exemplary system environment 200 is shown with three client computing devices, any number of client computing devices may be supported. Other devices such as devices with sensors, etc. may interact with cloud infrastructure system 130-1.

Network(s) 210 may facilitate communications and exchange of data between clients 204, 206, and 208 and cloud infrastructure system 130-1. Each network may be any type of network familiar to those skilled in the art that can support data communications using any of a variety of commercially-available protocols, including those described above for network(s) 110. Cloud infrastructure system 130-1 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the client's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 130-1 may include a suite of applications, middleware, and database service offerings that are delivered to a client in a self-service, subscription-based, elastically scalable, reliable, highly available, and secure manner. An example of such a cloud infrastructure system is the Oracle Public Cloud provided by the present assignee.

In various embodiments, cloud infrastructure system 130-1 may be adapted to automatically provision, manage, and track a client's subscription to services offered by cloud infrastructure system 130-1. Cloud infrastructure system 130-1 may provide the cloud services via different deployment models. For example, services may be provided under a public cloud model in which cloud infrastructure system 130-1 is owned by an organization selling cloud services (e.g., owned by Oracle) and the services are made available to the general public or different industry enterprises. As another example, services may be provided under a private cloud model in which cloud infrastructure system 130-1 is operated solely for a single organization and may provide services for one or more entities within the organization. The cloud services may also be provided under a community cloud model in which cloud infrastructure system 130-1 and the services provided by cloud infrastructure system 130-1 are shared by several organizations in a related community. The cloud services may also be provided under a hybrid cloud model, which is a combination of two or more different models.

In some embodiments, the services provided by cloud infrastructure system 130-1 may include one or more services provided under Software as a Service (SaaS) category, Platform as a Service (PaaS) category, Infrastructure as a Service (IaaS) category, or other categories of services including hybrid services. A client, via a subscription order, may order one or more services provided by cloud infrastructure system 130-1. Cloud infrastructure system 130-1 then performs processing to provide the services in the client's subscription order.

In some embodiments, the services provided by cloud infrastructure system 130-1 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, clients can utilize applications executing on the cloud infrastructure system. Clients can acquire the application services without the need for clients to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Clients can acquire the PaaS services provided by the cloud infrastructure system without the need for clients to purchase separate licenses and support. Examples of platform services include, without limitation, Oracle Java Cloud Service (JCS), Oracle Database Cloud Service (DBCS), and others.

By utilizing the services provided by the PaaS platform, clients can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer clients a Database as a Service in the form of a database cloud. Middleware cloud services may provide a platform for clients to develop and deploy various business applications, and Java cloud services may provide a platform for clients to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for clients utilizing services provided by the SaaS platform and the PaaS platform.

In certain embodiments, cloud infrastructure system 130-1 may also include infrastructure resources 230 for providing the resources used to provide various services to clients of the cloud infrastructure system. In one embodiment, infrastructure resources 230 may include pre-integrated and optimized combinations of hardware, such as servers, storage, and networking resources to execute the services provided by the PaaS platform and the SaaS platform. In some embodiments, resources in cloud infrastructure system 130-1 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 130-1 and by the services provided by cloud infrastructure system 130-1. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 130-1 may provide comprehensive management of cloud services (e.g., SaaS, PaaS, and IaaS services) in the cloud infrastructure system. In one embodiment, cloud management functionality may include capabilities for provisioning, managing, and tracking a client's subscription received by cloud infrastructure system 130-1, and the like.

In certain embodiments, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a client using a client device, such as client device 204, 206 or 208, may interact with cloud infrastructure system 130-1 by requesting one or more services provided by cloud infrastructure system 130-1 and placing an order for a subscription for one or more services offered by cloud infrastructure system 130-1. In certain embodiments, the client may access a cloud User Interface (UI), cloud UI 212, cloud UI 214 and/or cloud UI 216 and place a subscription order via these UIs. The order information received by cloud infrastructure system 130-1 in response to the client placing an order may include information identifying the client and one or more services offered by the cloud infrastructure system 130-1 to which the client intends to subscribe.

After an order has been placed by the client, the order information is received via the cloud UIs, 212, 214 and/or 216. At operation 236, the order is stored in order database 218. Order database 218 can be one of several databases operated by cloud infrastructure system 218 and operated in conjunction with other system elements. At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the client. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the client. Order provisioning module 224 provides a level of abstraction between the cloud services provided by cloud infrastructure system 130-1 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to clients on client devices 204, 206, and/or 208 by order provisioning module 224 of cloud infrastructure system 130-1. At operation 246, the client's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 130-1 may include an identity management module 228. Identity management module 228 may be configured to provide identity services, such as access management and authorization services in cloud infrastructure system 130-1. In some embodiments, identity management module 228 may control information about clients who wish to utilize the services provided by cloud infrastructure system 130-1. Such information can include information that authenticates the identities of such clients and information that describes which actions those clients are authorized to perform relative to various system resources (e.g., files, directories, applications, communication ports, memory segments, etc.). Identity management module 228 may also include the management of descriptive information about each client and about how and by whom that descriptive information can be accessed and modified.

Figure 3:
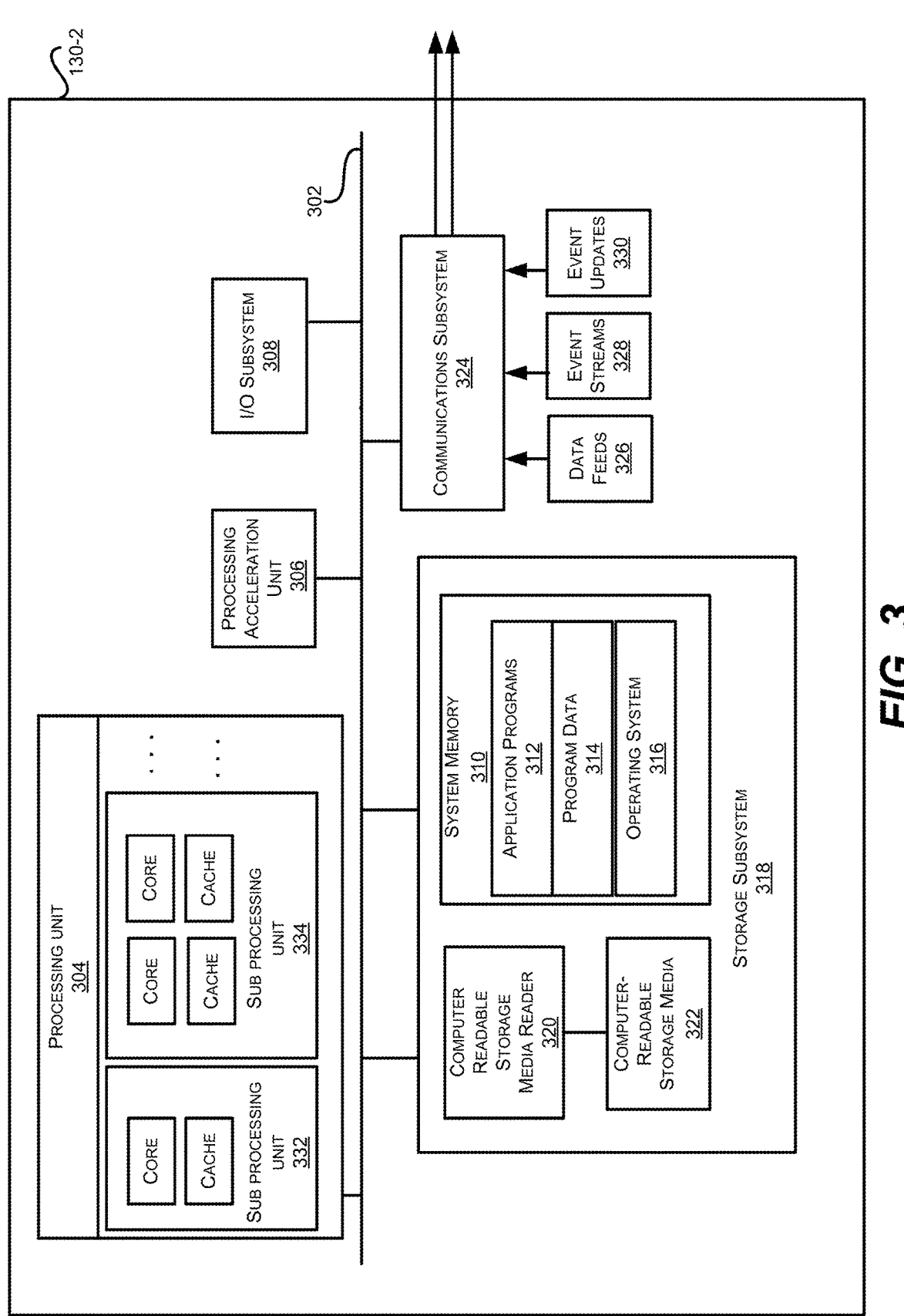
FIG. 3 illustrates an exemplary computer system, in accordance with disclosed embodiments according to the present disclosure.

FIG. 3 illustrates an exemplary computer system 130, in which various embodiments of the present invention may be implemented. The system 130 may be used to implement any of the computer systems described herein. As shown in the figure, computer system 130 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 130 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 130. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 130 may additionally include a processing acceleration unit 306, which can include a digital signal processor (DSP), a special-purpose processor, and/or the like. In some embodiments, the processing acceleration unit 306 may include or work in conjunction with an acceleration engine such as that disclosed herein to improve computer system functioning.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a database, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 130 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 130 may comprise a storage subsystem 318 that comprises software elements, shown as being currently located within a system memory 310. System memory 310 may store program instructions that are loadable and executable on processing unit 304, as well as data generated during the execution of these programs. Depending on the configuration and type of computer system 130, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 130, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 130 may also include a computer-readable storage media reader 320 that can further be connected to computer-readable storage media 322.

Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 130.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 130.

Communications subsystem 324 provides an interface to other computer systems and networks. Communications subsystem 324 serves as an interface for receiving data from and transmitting data to other systems from computer system 130. For example, communications subsystem 324 may enable computer system 130 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G, 5G or EDGE (enhanced data rates for global evolution), Wi-Fi (IEEE 802.11 family standards, or other mobile communication technologies, or any combination thereof)), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams

328, event updates 330, and the like on behalf of one or more users who may use computer system 130. By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 324 may also be configured to output the structured and/or unstructured data feeds 326, event streams 328, event updates 330, and the like to one or more databases that may be in communication with one or more streaming data source computers coupled to computer system 130.

Computer system 130 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 130 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Various methods described herein may be implemented by a computer system, such as computer system 130. Each step of these methods may be executed automatically by the computer system 130. In various embodiments, some steps may be provided with inputs/outputs involving a user. For example, a user may provide inputs for each step in a method, and each of these inputs may be in response to a specific output requesting such an input, wherein the output is generated by the computer system 130. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. Furthermore, some embodiments of each of the methods described herein may be implemented as a set of instructions stored on a tangible, non-transitory storage medium to form a tangible software product.

As with nearly all software-based systems, database systems are often required to undergo periodic upgrades in order to take advantage of new computing technologies. During a migration process, one or more older database systems may be migrated over to new database systems. Migration may be needed because software or hardware becomes obsolete, or because the advantages offered by newer database systems may provide efficiencies savings or other advantages. With embodiments of this disclosure, migration may allow for upgrading existing hardware and/or change the operating system of legacy database server machines, while keeping the database. By way of example, an existing database may be transitioned from legacy hardware to a new database machine (e.g., Exadata Database Machine).

A source database may refer to a database installation and may correspond to a grouping of one or more computer systems that stores and includes the database installation. The source database may fulfill retrieval, update, and other forms of database queries. A migration may refer to moving or copying objects in one or more source databases to one or more target databases. Therefore, prior to migration, the database installation may only be available on the source database(s). Following the migration, the database installation may be present on the target database(s) and, possibly, still present on the source database(s). The target databases may refer to a grouping of one or more computer systems that stores the database installation after the migration. The target databases may then include the database installation and fulfill retrieval, update, and other forms of database queries following the migration.

Figure 4:
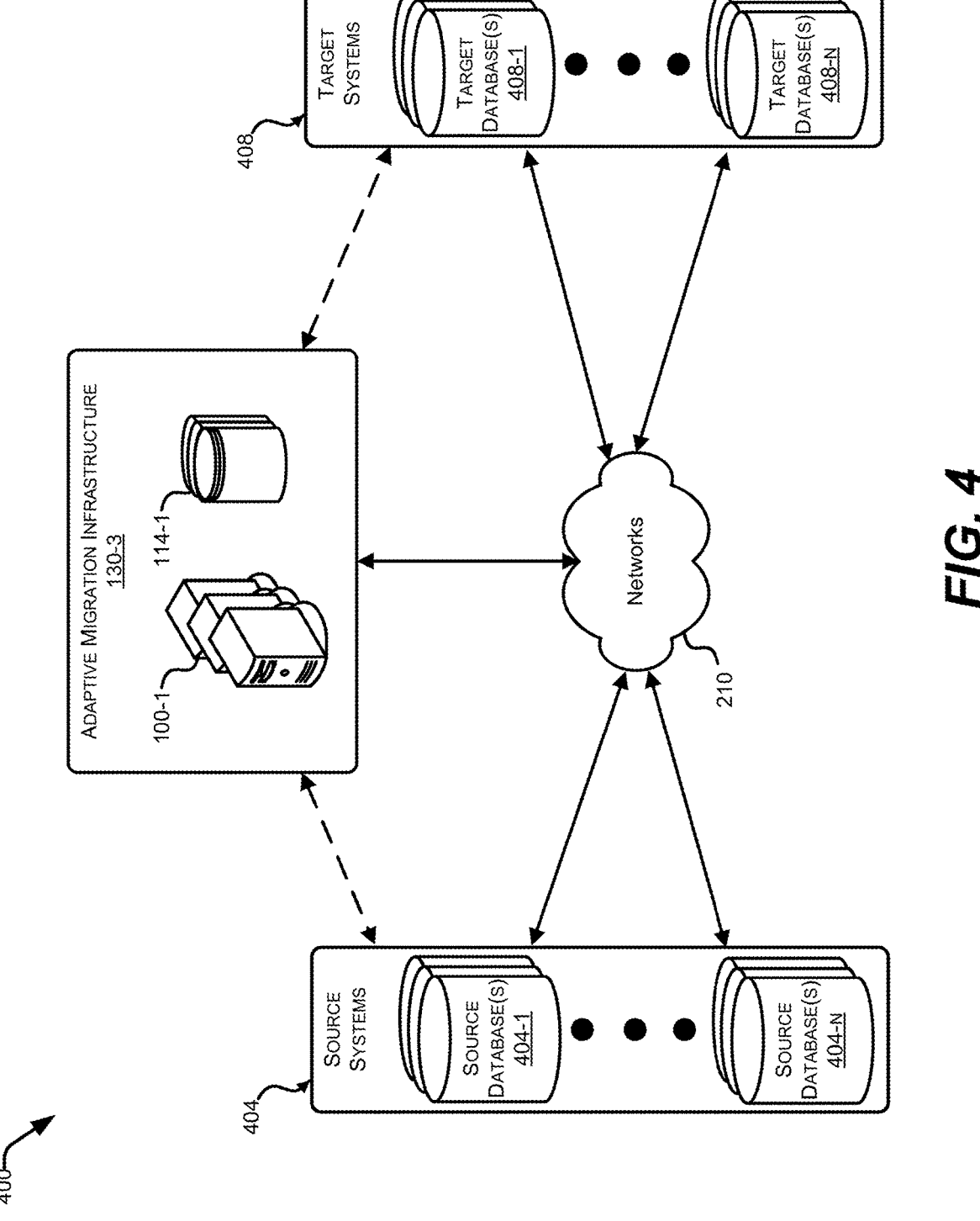
FIG. 4 illustrates a high-level block diagram of certain aspects of a migration environment, in accordance with embodiments of the present disclosure.

FIG. 4 depicts a high-level block diagram of certain aspects of a migration environment 400, in accordance with embodiments of the present disclosure. The migration environment 400 may at least partially correspond to the distributed system 100 and the system environment 200. The migration environment 400 may include the system 130, which may be or otherwise correspond to an adaptive migration infrastructure 130. The adaptive migration infrastructure 130 (which may be referenced herein as "adaptive migration system" or "migration system") may include one or more servers 112 and/or one or more computer systems 300 and may correspond to the cloud infrastructure system 202 in some embodiments.

A client IT infrastructure may house one or more source systems 404 (e.g., database systems) as well as one or more target systems 408 (e.g., database systems). For relatively large enterprises, the client IT infrastructure may be geographically distributed across multiple locations. For relatively smaller clients, the client IT infrastructure may be located in a single facility. In some instances, for example, the target systems 408 may reside in the same room as the source systems 404.

In some embodiments, the target systems 408 may be located remotely. In some embodiments, the target systems 408 may be operated by a cloud storage facility. This type of migration may relieve the client from the responsibility of operating and maintaining the target systems 408. In some embodiments, the target systems 408 may be co-located with or co-operated by the same entity providing a cloud migration service. For example, the target systems 408 may be integrated with a remote operations center of a cloud service, e.g., of the cloud infrastructure system 202 in some embodiments.

It will be understood that the adaptive migration infrastructure 402 may be remotely located from the source systems 404 and the target systems 408, and the source systems 404 and the target systems 408 may or may not be remotely located from one another. As used herein, the term "remotely located" will be understood to mean geographically remote or geographically removed. Entities that are remotely located from each other will typically be located in separate facilities many miles away from each other. For example, entities that are remotely located from each other may be separated by distance of at least 5 miles, 10 miles, 15 miles, 100 miles, and/or the like.

The migration infrastructure 402 may include one or more migration control server systems 100-1 and one or more automated transition suite databases 114, and may be configured to provide an automated transition suite designed to facilitate migration of the one or more source systems 404 to the one or more target systems 408 in as highly automated a manner as possible. The migration infrastructure 402 may correspond to a centralized structure that supports various migration methods for migration to various targets for the target systems 408 such as cloud on premise, public cloud, autonomous database(s), and/or the like. Further, the migration infrastructure 402 may allow for dynamically switching between two or more different migration placement methods to migrate components (e.g., to migrate databases, applications, etc.) of the one or more source systems 404 to the one or more target systems 408. The migration infrastructure 402 may be configured to provide many automated services for performing migrations bundled into a single approach. Further, the migration infrastructure 402 may be configured to dynamically identify the most appropriate set of one or more services as a function of migration characteristics of the particular migration scenario for the migration of the one or more source systems 404 to the one or more target systems 408. In so doing, the migration infrastructure 402 may be configured to select a set of one or more best methods for the particular migration, the selection being a function of a number of variables/factors disclosed herein.

Contrary to conventional migration, with migrations facilitated by the migration infrastructure 402, it is not necessary for an engineer to connect to the source system 408, configure it, install the needed software, getting the activation key, etc. The automated transition suite may run on a centralized host, e.g., a virtual machine in some embodiments. The machine may correspond to the one or more control server systems 100-1. Migration processes may be started and controlled by the control server systems 100-1. The access to the source systems 404 and the target systems 408 may use secure connections (e.g., Secure Shell (SSH) connections or the like) and/or database links within the databases. The data transport may rely on a database-to-database communication and may be completely independent of the underlying operating system and storage platforms. The network interfaces of the migration infrastructure 402 may include one or more API interfaces to transmit to and/or receive communications from the source systems 404 and/or the target systems 408 using APIs. The one or more API interfaces may include one or more APIs that define protocols and routines for interfacing with the source systems 404 and/or the target systems 408 via an API interface. The APIs may specify API calls to/from the source systems 404 and/or the target systems 408. In various embodiments, Secure Shell (SSH) and/or any other suitable protocol may be used to facilitate communications between the migration infrastructure 402 and the source systems 404 and/or the target systems 408. In some embodiments, to gather system data, the migration infrastructure 402 may run one or more scripts, select one or more databases, establish one or more communication pipes to the one or more databases, log into the one or more databases for command line access via a transport layer by, for example, IP address and SSH, and pull system data from the one or more databases.

All manual steps on the source systems 404 and the target systems 408 may be eliminated. This architecture may allow for the inclusion hundreds or more of systems into a migration project and may allow for control of all migrations from a single application. Each server of the control server systems 100-1 may have sufficient hardware resources to run all processes for 4, 10, 20, or more parallel migrations. The automated transition suite may save all scripts and logfiles, created in each migration, on file system and in the automated transmission suite databases 114.

Migration setups may include initially registering the source systems with the migration infrastructure 402, configuring source access (e.g., source OS access) for access by the migration infrastructure 402 at least partially by loading source access definitions from file and generating definitions automatically for all systems, deploying collection and/or analysis agent(s) on the source systems 404 to perform the database analyses, configuring the database links and database link information needed to access the systems remotely, and analyzing the source systems 404 by running the source system analyses to acquire detailed information about the configured source systems 404. Disclosed embodiments may increase the speed of setup so that it only takes several minutes, as opposed to half a day to copy all files, do export and import, configure user permissions, configure source system access, etc. In some embodiments, CSV files may be used, and, instead of having to log on to the source system 404 to load a SQL package, create directories, file system, etc., the central instance provided by the infrastructure 402 may be logged into in order to load the information from a file and run all remotely. Access to the source system 404 may be provided through a database link to skip manual configuring of the source systems 404. Such processes, the deploying of analysis agents and the performance of analyses, for example, may run in the background. This may allow for the seamless testing of a large number of systems, without blocking, disrupting, or otherwise hampering other activities.

The migration infrastructure 402 may automatically install an agent on the source databases 404 to run the analysis after any necessary privileges (e.g., selecting any dictionary, restricted session, connection, select catalog role, execute on database system admin, and/or the like privileges) have been granted to the agent. Configuring the database to connect to the source systems 404 may include loading a migration package and running the migration package on by the migration infrastructure 402. Analyses may then be executed remotely through the database links. The suite may create the database links automatically. TNS configuration may not be needed to do so, and the database links may use connection strings (e.g., hostname: port/SID) to connect to the source systems 404 and the target systems 408. The client may configure firewalls so that an inbound connection, using TNS-specific ports, are allowed to the source systems. Listener configurations may be updated on the source systems 404 and/or the target systems 408, if connections only from specific hosts are configured. Database link configuration may be loaded using an input file to load the database link definitions with syntax of host name and database name corresponding to the host name and database name combinations of the source systems 404 configuration and/or the target systems 408 configuration to facilitate the mapping to the source systems 404 and/or the target systems 408. The analyses of the source systems 404 and/or the target systems 408 may proceed with the passing of the validation for the database link configuration.

One of the elements of the cloud support service may be a gateway that communicates with the migration infrastructure 402 through a secure connection using a communication module over the network(s) 210. In order to interface with the migration infrastructure 402 and the services available thereby, the IT infrastructure may include a gateway provided by the migration infrastructure 402 and operating locally with respect to the source systems 404. An Enterprise Manager may be implemented as a specialized module within the gateway. The gateway may include a module that has access to the source systems 404 and can provide statistics and information regarding the source systems 404 to the adaptive migration infrastructure 402. The gateway may include a hardware and/or virtual software appliance installed at the client data center.

The gateway may collect information from the source systems 404, including information on data objects to be migrated to the target systems 408, source/target information, and operating system configurations, and may transmit such information to both the target systems 408 and/or the adaptive migration infrastructure 402. The support gateway may collect performance information and configuration data related to the source systems 404 and/or the target systems 408, and the adaptive migration infrastructure 402 may then use that performance information to perform a migration analysis, generate migration scripts, generate a migration plan that are customized for the client IT infrastructure, and then execute the migration plan to migrate the source systems 404 to the target systems 408.

In some embodiments, the migration and data analyses may be carried out by the gateway installed as an integrated part of the client system. The gateway may communicate with the migration infrastructure 402 and the portal disclosed herein in order to govern and report on the migration process. Disclosed embodiments may utilize the enterprise manager to consistently and/or periodically monitor and model the database systems 404 and/or 408. An Enterprise Manager agent may be employed to collect and monitor modeling data associated with the customer's databases. Additionally, customer configurations such as EM plugins or custom collectors that interrogate and analyze source and/or target systems may be used. This information may be uploaded to a service of the migration infrastructure 402 through the gateway that resides on the client system. The service of the migration infrastructure 402 may then perform calculations and analysis on the data recorded by the agent in order to provide data for specific migration scenarios.

The migration infrastructure 402 may determine if a gateway is available to give access to/from one or more client sites in order to allow service delivery. If a gateway is available, the migration infrastructure 402 may examine the gateway configuration to ensure that the gateway is properly configured, including the agents, with the migration infrastructure 402 configuring of the gateway and the agents as necessary. If a gateway is not available, the gateway may be downloaded for installation. It may be installed at a client site and configured along with the agents and plug-ins using auto-discovery to set up workflow for the service. Agents may be deployed on all relevant hosts identified via pre-flight phase. The agents may, in various embodiments, correspond to a bot, a listener, a plug-in, and/or the like software components/modules configured to perform the features disclosed herein with respect to the source systems 404, the target systems 408, and/or the migration infrastructure 402.

Among other things, various embodiments according to the present disclosure may facilitate placement of system workloads into complex cloud infrastructure. The cloud workloads may include application workloads and cloud workloads, including database workloads from advanced relational database management system (RDBMS) architectures. Various embodiments may provide for a new bin-packing/workload placement algorithm for provisioning database workloads that takes into account fine-grained monitoring information and advanced architectures such as clustered Oracle databases that enable High Availability (HA). In some embodiments, the systems, methods, and non-transitory media disclosed herein may be cloud agnostic, homogenous to cloud vendor, and/or may be implemented on any architecture or configuration-remote, on-premises, etc. regardless of cloud configuration as long as there is a source and a target.

Various embodiments may facilitate placement of database workloads at least in part by utilizing a bin-packing algorithm that may address the above-mentioned issues and problems and that may place any vector (multiple metrics) of any dimension accurately regardless of whether the workload comes from a pluggable, clustered, or standby database configuration. Various embodiments may include extensions to bin-packing algorithms that may be required when dealing with workloads from advanced computational architectures such as clustering, or workloads that exhibit complex data patterns in their signals, such as seasonality, trend and/or shocks (exogenous or otherwise). These extensions may be especially needed when consolidating workloads together, for example, consolidation of multiple databases into one (pluggable databases) to reduce database server sprawl on estates. With disclosed embodiments including bin-packing for clustered environments, various embodiments are further configured to utilize new algorithms that introduce a time element, giving a richer system-recognition of the resources requested when workloads are consolidated together, ensuring High Availability (HA) for workloads obtained from advanced database configurations. Disclosed embodiments may reduce the risk of provisioning wastage in on-demand cloud architectures.

Additionally, disclosed embodiments may provide for advantages such as: placing of clustered workloads without reducing high availability from maximum availability architecture; high-end automation eliminating the manual engineer spreadsheet approaches or reducing the time needed for such approaches from days/weeks to minutes/hours; reducing human error in calculating benchmarks such as SPECInt, Disk IO, and/or the like; creating storable plan/design specifications that may be stored in a central repository of the bin-packing workloads being placed; being recursive in that embodiments may work for any vector and can be used for applications as well as RDBMS; vectors that are scalable and may bin-pack on multiple metrics; working as a template with user inputs; and/or the like. Further, disclosed embodiments may be able to handle clustered workloads and, once the placements have been assigned, may re-evaluate the newly created signals and identify if there is a need for elasticization of the cloud resources. As disclosed further herein, various embodiments may employ a software algorithm that may take traces of data from metrics such as CPU, memory, and IO, then obtain the max_value of the metrics to build a vector. Various embodiments may identify that the vector is part of a cluster and then place all siblings of the cluster. If the cluster cannot be placed discretely into the target cloud environment, then any previously placed sibling workloads may be rolled back.

Figure 5:
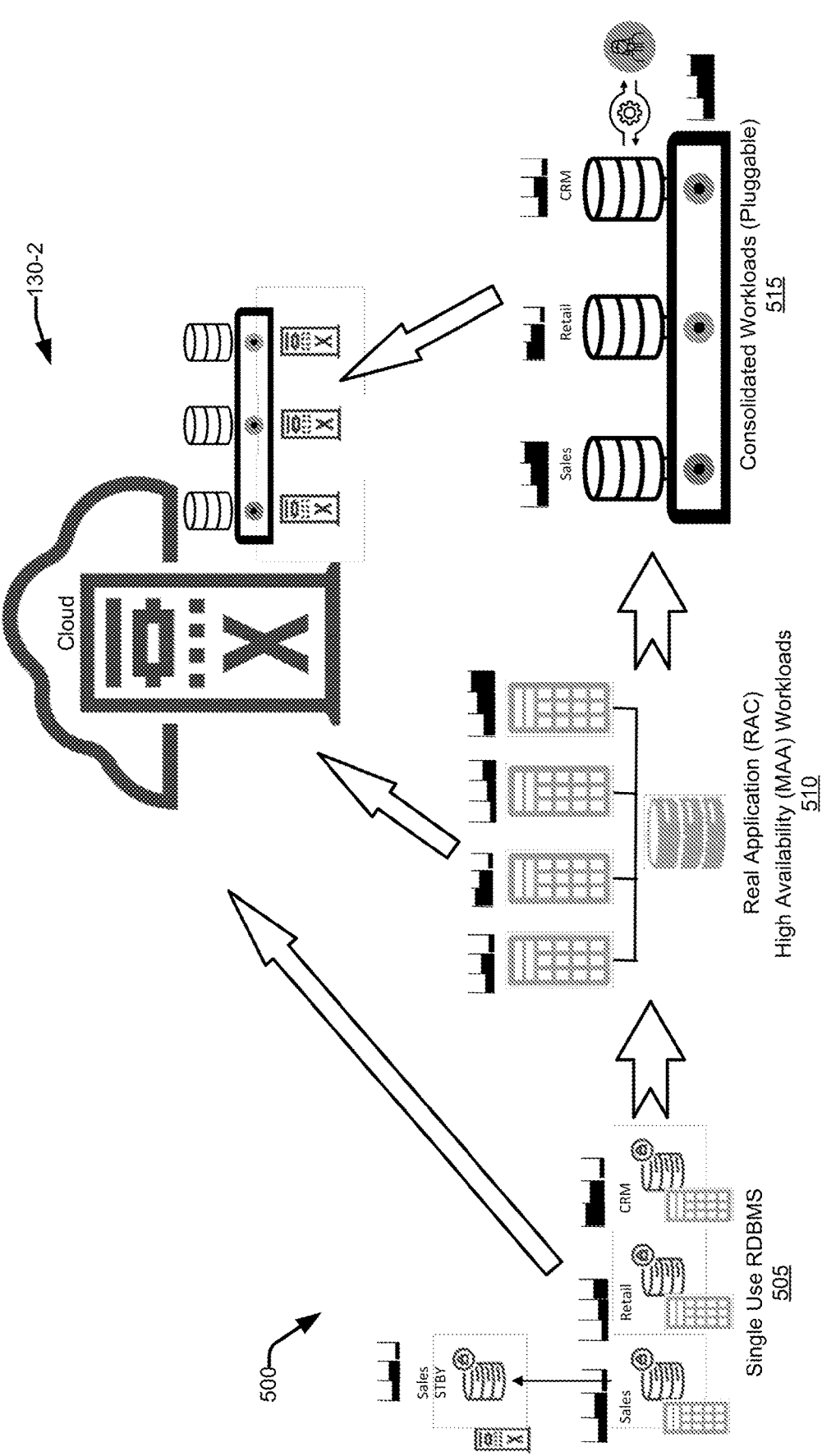
FIG. 5 illustrates various example configurations and workload complexities that may be served by the system, in accordance with disclosed embodiments according to the present disclosure.

FIG. 5 illustrates various example configurations and workload complexities that may be served by the system 130, in accordance with disclosed embodiments according to the present disclosure. As illustrated in the examples, there are many types of database configurations that can consume a vector of resource in accordance with disclosed embodiments. Organizations served by the system 130 have eclectic sets of configurations 500 that may include a single instance configuration 505 with standby database. Each workload may have a vector including the standby, as a standby is still consuming resources and will be usually more IO heavy. Organizations tend to move to a RAC configuration 510 approach with standbys and each instance in a cluster will consume resources. The critical thing here is that the cluster will run unevenly. Thus, one workload will consume more resources than the others in the cluster. Now, with a pluggable configuration 515, workloads can be isolated and consolidated within a container database, but one common thing is the container has a workload, as do the individual pluggable databases each with a workload. Regardless of configurations, they all have vectors, and, if with moving to the cloud or already being in the cloud, then understanding what and where those vectors are is key. The vectors may increase with additional metrics, too, as the system may be sensitive to different metrics (e.g., some may be more IO intensive than CPU, etc.).

When employing I.T. (information technology) systems to satisfy requirements, regardless of the type, combination or configuration, one thing has always been prevalent, which is the question of consumption, whether it is prior to a migration, re-platform, upgrade, or installation. Understanding what resources are required over a period of time is key to the management of all I.T. systems. As hardware specifications increase, for example, in performance and capacity, the actual physical infrastructure decreases, but, with the adoption of virtualization, the problem of server sprawl, arguably stays the same. The tradeoff between system separation conflicts with true consolidation that requires the workloads to be combined or share the same infrastructure. Knowing how best to fit workloads together is a problem that has always been an important problem to solve. In computing, bin-packing may be used to place smaller workloads into larger infrastructure to establish how resources should be assigned to a set number of tasks. However, bin-packing requires additional constraints when dealing with advanced system architectures such as clustering and elasticizing workloads once placed.

Figure 6:
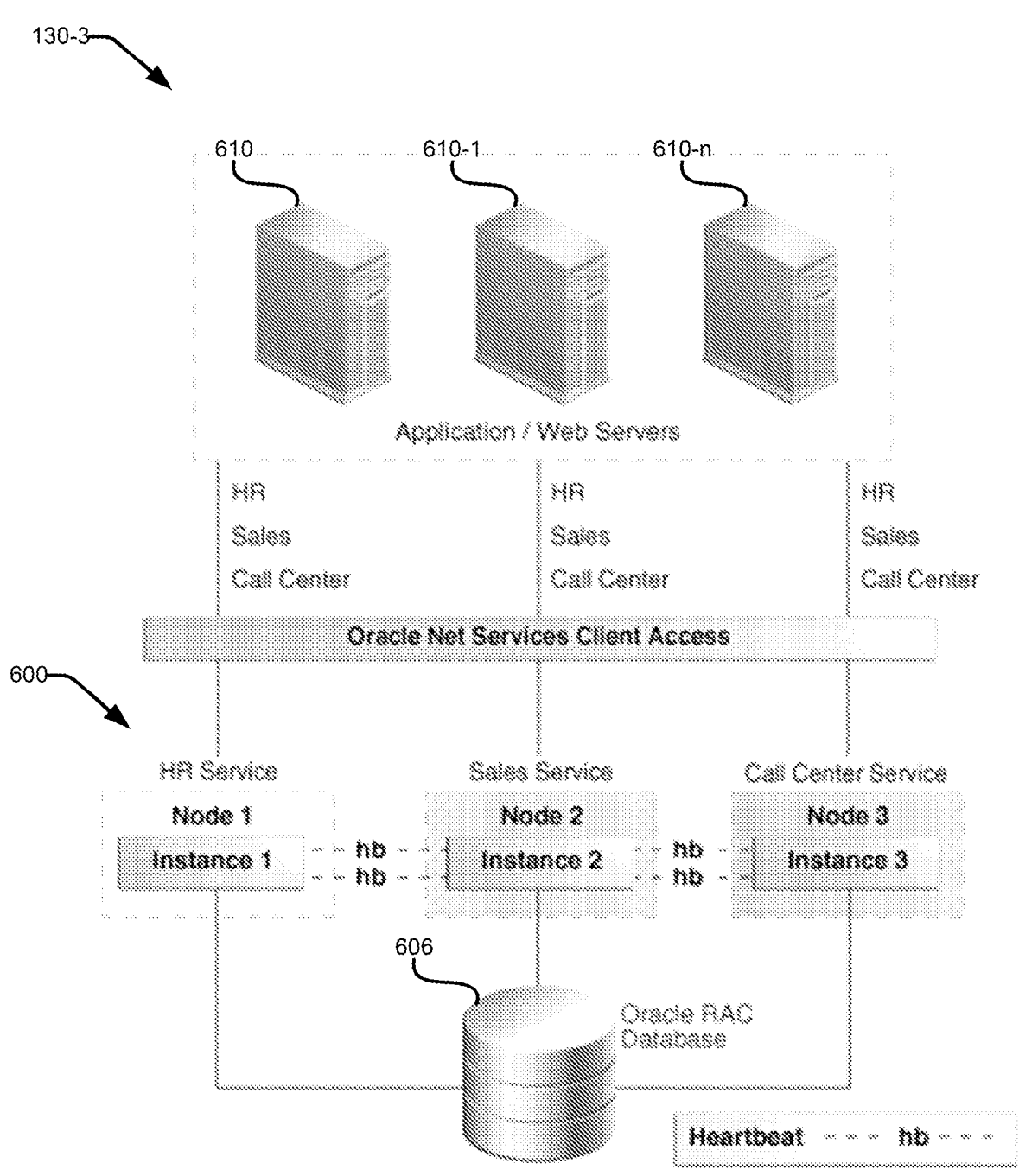
FIG. 6 illustrates clusters that are managed together, participating to act as one system, in accordance with disclosed embodiments according to the present disclosure.

The problem to be solved is multifaceted. When the placement problem is broken down, it becomes apparent that these facets are inter-related, that is to say, all parts of problem need to be addressed together, rather than just individual elements. Clusters are groups of servers (also known as nodes) that are managed together, participating to act as one system, usually to provide high availability, as shown in FIG. 6. FIG. 6 illustrates clusters 600 that are managed together, participating to act as one system, in accordance with disclosed embodiments according to the present disclosure. These clusters 600 may reduce downtime and outages by allowing another server to take over should an outage occur or maintenance be required. Database clustering is the running of a database 605 across multiple servers while accessing shared storage, for example, database datafiles that are stored on a SAN (Storage Area Network), NAS (Network Attached Storage), a disk array, or cloud storage capabilities, such as block, file, or object storage. In FIG. 6, a user may request access to the HR, sales, or call center applications from any web server 610. The net services layer of the technology stack may handle client access and may direct user connections to the node where the service is running (e.g., sales is directed to run from node 2). A heartbeat between the nodes may ensure cluster integrity, should one of the nodes no longer react or produce a heartbeat, the service fails over and user connections are handled by the remaining nodes. This type of architecture may facilitate a 24*7 SLA.

Figure 7:
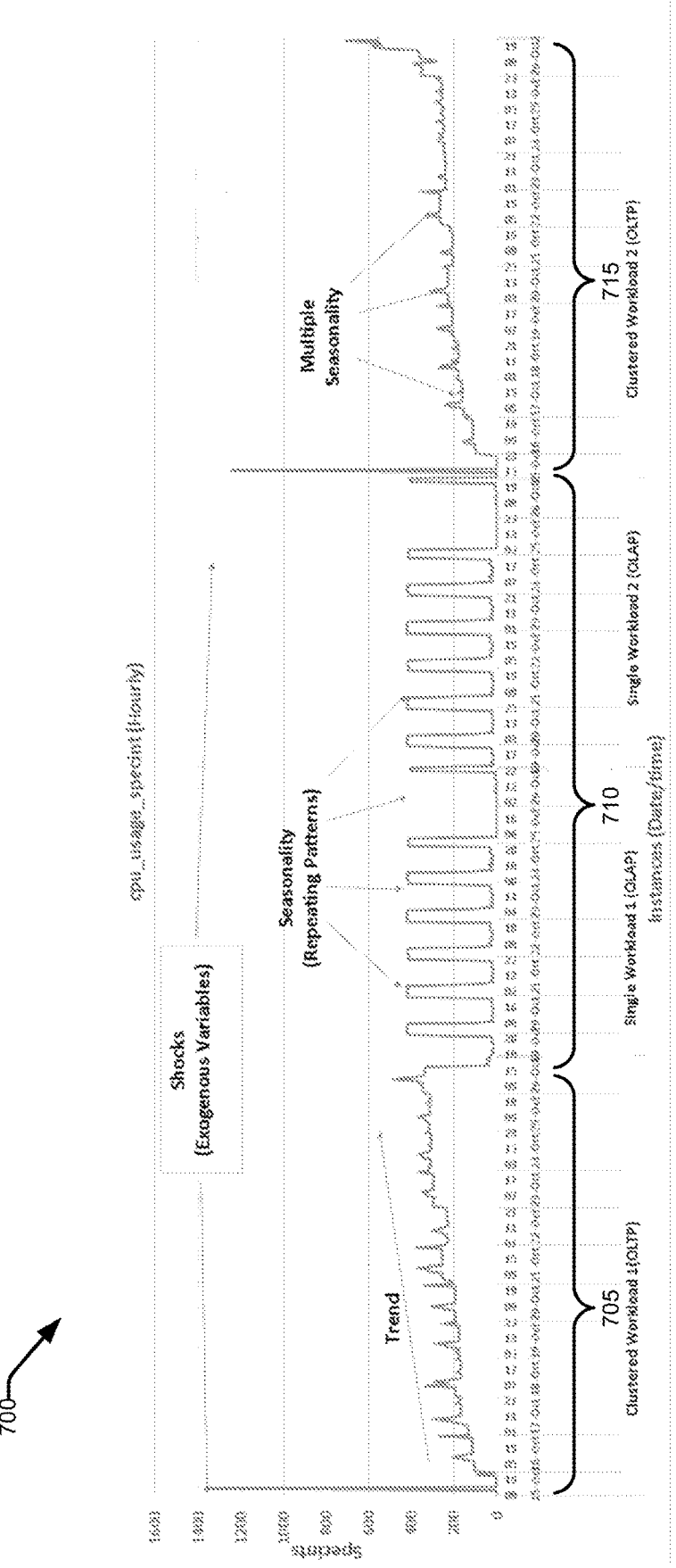
FIG. 7 illustrates aspects of CPU usage, in accordance with disclosed embodiments according to the present disclosure.

Referring again to FIG. 5, workloads may include collections of tasks submitted by users. In some examples, a workload may be a database, application, or even a piece of code. The tasks may be small units of work or individual pieces of SQL such as Data Modification Language (DML) statements that perform inserts, updates and deletes, that serve a web application, for example by way of an Online Transaction Processing (OLTP) system. Other workloads may include lager units of work such as batch jobs that aggregate information in the database periodically, for example, aggregation of sales data from hourly into daily, weekly, or monthly, which is a common feature in data warehousing (e.g., OLAP). Another type of workload is a data mart that may be described as somewhere in between OLTP and OLAP. Data marts may consist of a combination of smaller DML OLTP units of work with medium OLAP type aggregations. Data marts may be a subset of a large data warehouse that are subject-orientated such as sales, HR, or call center that are an aggregation of days and weeks rather than months or years. These units of work may vary in the amounts of resources consumed, and, when analyzed in a time series format, the task often dictates when the consumption of resources consumed to satisfy the task takes place. When these tasks are analyzed via a trace, the system 130 may identify those tasks exhibiting different patterns in their resource consumption. For example, FIG. 7 illustrates aspects of CPU usage 700 with complex data structures, in accordance with disclosed embodiments according to the present disclosure. In FIG. 7, there are four workloads for CPU side by side. The first task 705, OLTP, shows a progressive trend with subtle repeating patterns (e.g., seasonality). The next two tasks 710, 715 are OLAP and data mart, respectively, showing a more definitive pattern of repeating tasks with little trend.

Figure 8:
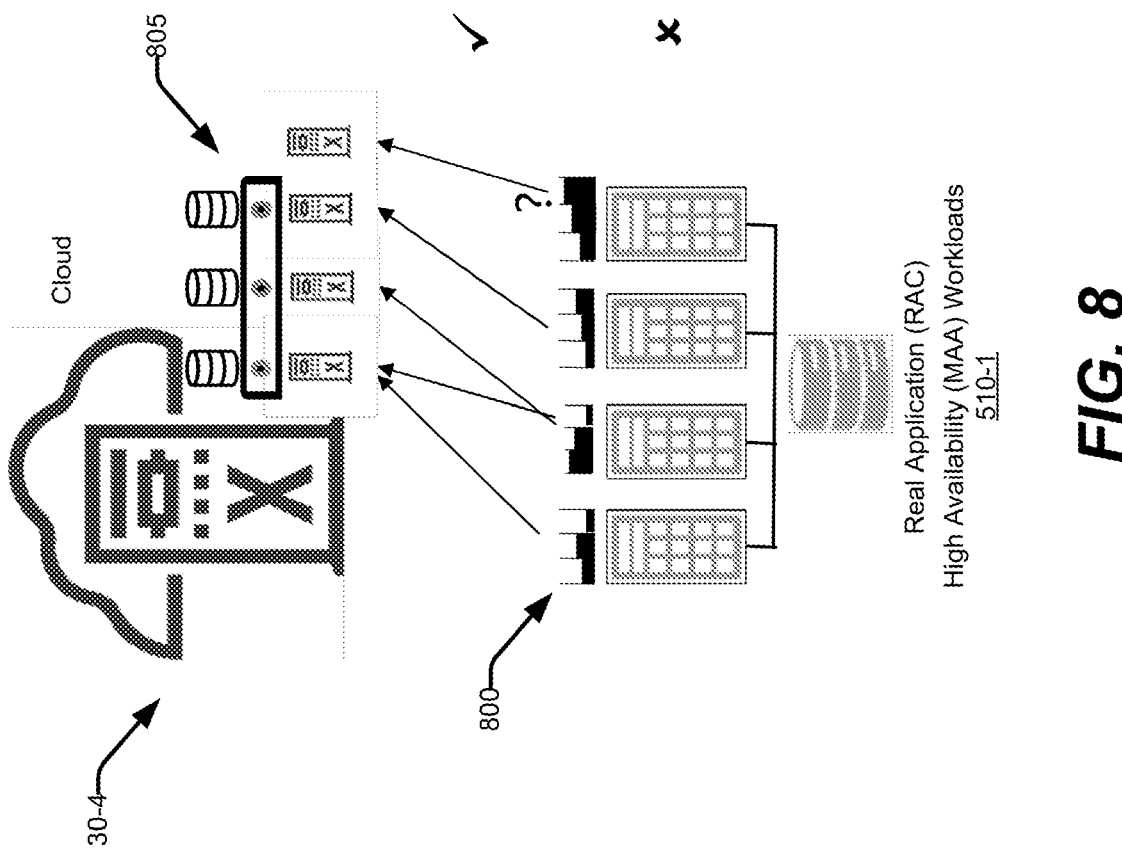
FIG. 8 illustrates example aspects of RAC workload complexity addressed by disclosed embodiments of the system, in accordance with disclosed embodiments according to the present disclosure.

FIG. 8 illustrates example aspects of RAC configuration 510 workload 800 complexity addressed by disclosed embodiments of the system 130. When placing workloads 800, each workload 800 may be treated separately by extracting the peak values of each metric from each database instance on each node in each time interval, placing them in the target node. This may be simple enough as long as the workloads 800 are singular (independent of each other and run on a single node). When the workload 800 is clustered, it becomes more complicated because, when placement commences, placing the workloads 800 must be done without compromising HA. Therefore, for one clustered workload 800 to be placed, all workloads 800 in the cluster must be placed. If a clustered workload 800 is placed without its sibling, there is a risk of reducing a clustered workload 800 to a singular workload, the consequence being loss of high availability, thus compromising SLAs. The same understanding is required for pluggable databases, where a database may be detached from a singular database instance and plugged into another clustered database instance.

As an example of the problems with conventional technology, RAC configuration 510 workloads 800 may be spread on each source node. As illustrated by FIG. 8, RAC configuration 510 workloads 800 cannot be placed in the same target node, unless there are enough nodes, then all workloads 800 are placed discretely. In one example of the problems with conventional technology, four workloads 800 cannot be placed into three target nodes 805 in the cloud. No other bin-packing algorithms (i.e., other than those disclosed herein) are able to solve this conundrum when they place workloads 800. If all workloads 800 cannot be placed discretely, the placement may be rolled back, and resources may be allowed to be available to other workloads 800 that need to be placed. In OCI, the three target nodes 805 may be configured and built, but, because there are four siblings in the cluster, the MAA cannot work, as four does not go into three. RAC configuration 510 workloads 800 may be shared across multiple nodes 805 (MAA). QoS is employed where some nodes are isolated to run functions. Therefore, each database instance and the resources consumed should be accounted for. The reasons for this may be because of quality of service where some apps are given a priority over nodes against other apps should a node 805 fail.

Consolidation may be described as running several workloads on a shared collection of nodes. There are several drivers for consolidation, such as system simplification or reducing server sprawl, whether that is the number of servers, clusters, databases or workloads. Server sprawl can be described as a situation where servers are not being used to their full capacity, leading to significant wastage in terms of space, power and cooling, which can end up costing organizations substantial amounts of money. Consolidation of databases has become easier with the development of pluggable databases where a database can be detached from a singular or clustered container DBMS (memory structures that make up an instance) and plugged into another container DBMS that already has multiple plugged-in databases. Detaching and attaching pluggable database allows the pluggable database (and its associated datafiles) to be relocated to another server and be managed by another database instance (DBMS).

Figure 9:
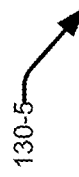
FIG. 9 illustrates aspects of pluggable databases with a multitenant architecture, in accordance with disclosed embodiments according to the present disclosure.
Figure 9:
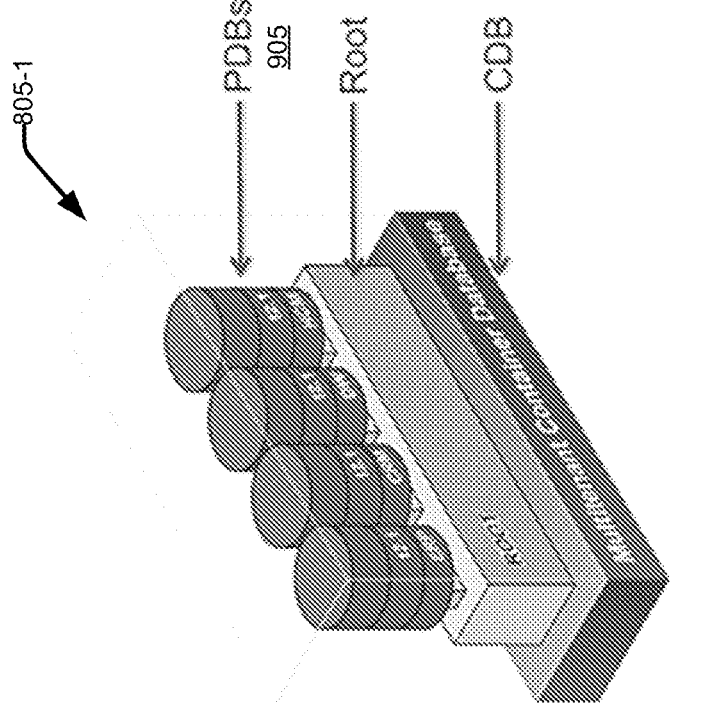

This is illustrated in FIG. 9, adding a further layer of abstraction when working in conjunction with HA. FIG. 9 illustrates aspects of pluggable databases 905 with a multi-tenant architecture 900, in accordance with disclosed embodiments according to the present disclosure. With each node 805 in the cluster also housing a clustered container, and, within each clustered container, there are pluggable databases 905. This architecture 900 removes the support overhead of the database instance serving one database when one database instance can serve multiple plugged-in databases 905 while achieving HA. However, it becomes challenging to understand where resources are consumed when undertaking a placement exercise. For the purposes of simplification, pluggable databases 905 may be treated in the same database instance, but there is no reason why a pluggable database 905 could not be separated as its own entity and be treated as owning a workload in its own right.

Part of the problems solved by the system 130 can be considered as follows. Assume a collection of workloads 800, some of which are clustered, and a collection of computational nodes 805. Each workload 800 has a time-varying demand for resources defined using several metrics, and each server has a capacity defined using the same metrics. The task is to assign the workloads 800 to the nodes 805, such that the demands placed by the workloads 800 are always within the capacity of the nodes 805, while respecting the constraints imposed by the clustered workloads 800. Conventional bin-packing algorithms do not take into consideration the divergent types of applications assigned to singular servers.

Figure 10:
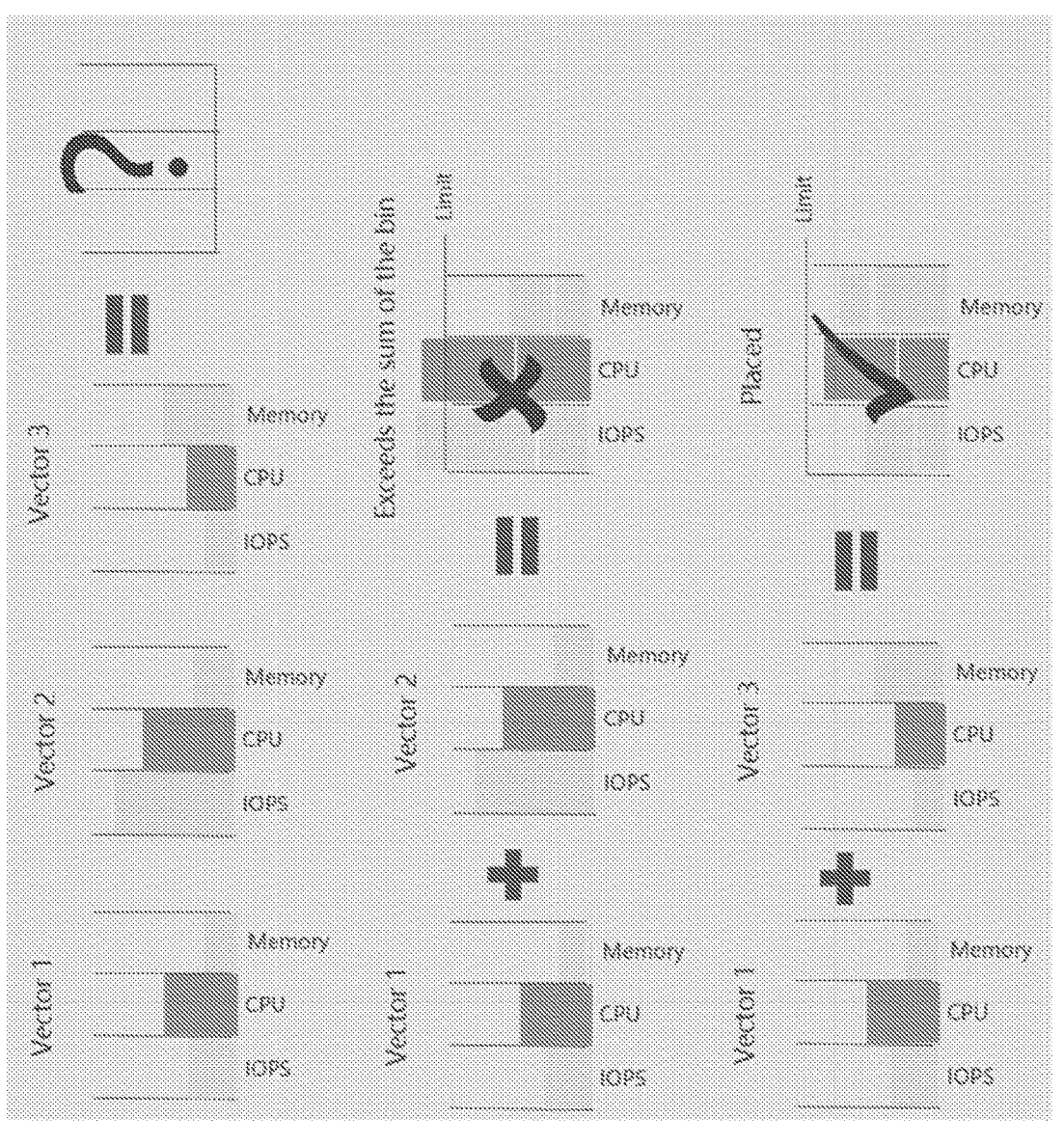
FIG. 10 illustrates aspects of vectors, in accordance with disclosed embodiments according to the present disclosure.

The need for optimal resource usage with the aim of reducing wastage is ever more apparent in cloud computing with users accessing any shape of resources (vectors) from anywhere with the requirement of still being optimized. As illustrated by FIG. 10, vectors may define multiple metrics (e.g., IOPS, memory utilization, CPU utilization, and/or the like) making up a shape rather than one singular metric.

Each workload may be defined by one or more vectors. When it comes to vector placement using the bin-packing approach in a clustered environment, it is possible that several workloads running on the same cluster are full or with a combination of classifications that could break their algorithm. Clustered workloads that required enforced SLAs where workloads of differing priority may run from x node in the cluster. Vector bin packing may ensure that the sum of the workloads do not exceed the sum of the bin at any given time. In the illustrated example, there are three vectors (Vectors 1, 2, and 3) to be placed together in an empty target. If Vectors 1 and 2 are placed together, it does not fit as it exceeds the sum of the bin, whereas that is not the case with vectors 1 and 3. Vectors may correspond to multiple metrics that may be used by the system 130 to account for the workload peaks and troughs over time. The system 130 may predict workloads future usage and may identify wastage once workloads are consolidated. Vectors may be dynamic and can increase in their size by adding more metrics.

The basic bin packing problem is the process of taking items of differing volumes and packing them into a finite number of bins in a way that minimizes the number of bins used. Approximate, heuristic, algorithms are often used in practice. There are many approaches to bin-packing, such as First-Fit Decreasing (FFD), Next-Fit (NF) and Best-Fit (BF). Considering First Fit Decreasing, all workloads being provisioned may be treated as having equal priority. Elastic Resource Provisioning (ERP) is assigning all workloads into one bin and elasticizing the bin to fit around the workloads being placed. Various embodiments may improve FFD to tackle complex architectures such as clustered workloads and empirically evaluate them experimentally.

First Fit Decreasing Placement (FFD)

Figure 11:
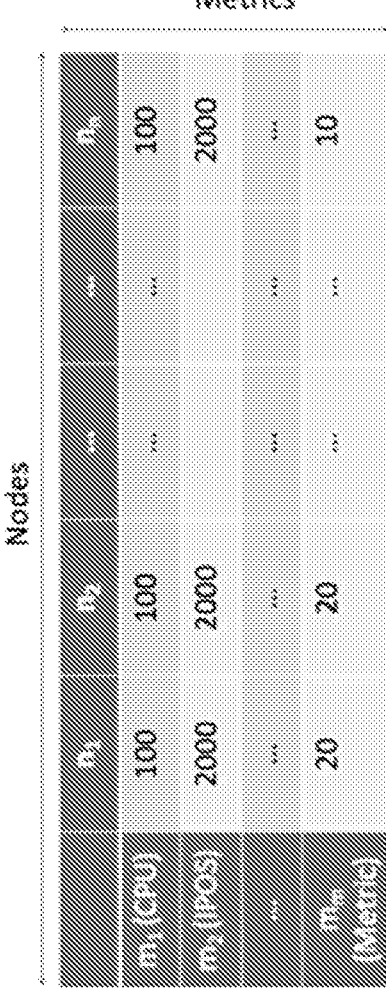
FIG. 11 illustrates aspects of node resource capacity, in accordance with disclosed embodiments according to the present disclosure.
Figure 12:
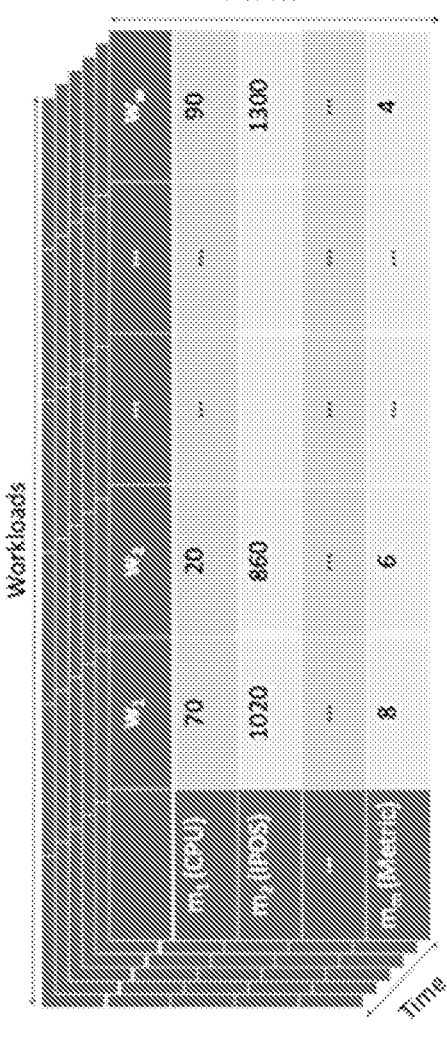
FIG. 12 illustrates aspects of workload resource demand, in accordance with disclosed embodiments according to the present disclosure.

The notation used to describe bin packing herein is listed in Table 1 and illustrated in FIGS. 11 and 12. FIG. 10 illustrates aspects of node resource capacity 1000, in accordance with disclosed embodiments according to the present disclosure. FIG. 12 illustrates aspects of workload resource demand 1200, in accordance with disclosed embodiments according to the present disclosure. The available resource may be represented as a set of nodes, each of which has a capacity defined using a set of metrics, that can include CPU, memory usage, logical IOs per second, etc. The bin-packing task may be to assign a set of workloads to the nodes. The demand associated with each workload may be defined in terms of the same metrics as are used to describe the nodes, but the demand may vary over a set of times. The time-varying demand may be based on measured or predicted loads, for example, using time series analysis techniques to model database workloads for capacity planning.

TABLE 1

Notation for workload assignment.

| Notation | Interpretation |
|---|---|
| Nodes = $\{n_1, \ldots n_n\}$ | Computational Nodes. |
| Workloads = $\{w_1, \ldots, w_w\}$ | Workloads, |
| Metrics = $\{m_1, \ldots, m_m\}$ | Metrics (CPU, IOPS, etc). |
| Times = $\{t_1, \ldots, t_l\}$ | Time intervals. |
| Assignment(ni) → W | The set of workloads $W \subseteq$ Workloads assigned to $n_i$. |
| Capacity($n_i, m_j$) | The maximum capability of node $n_i$ in relation to metric $m_j$. |
| Demand($w_i, m_j, t_k$) | The peak demand that workload $w_i$ has for resource of type $m_j$ during time interval $t_k$. |
| isClustered($w_i$) | true iff $w_i$ is in a clustered workload. |

TABLE 1-continued

Notation for workload assignment.

| Notation | Interpretation |
|---|---|
| Siblings(w$_i$) | The set of workloads s $\subseteq$ Workloadss in the cluster of which w$_i$ is a member. |

Sorting Workloads

First fit decreasing may sort workloads so that they can be assigned largest-first, and hence a notion of size is needed. Here, order may be defined in terms of the demand across different metrics, normalizing according to the total usage for each metric. Overall demand for each metric (CPU, IOPS, memory, storage) may be obtained from the demand of each workload:

$$\text{overall\_demand}(m) = \sum_{n_i \in Nodes} \sum_{w_j \in Workloads} \sum_{t_k \in Times} \text{Demand}(w_j, m, t_k) \quad (1)$$

Then, the normalized demand of a workload w may be the normalized sum of its demand over all metrics:

$$\text{normalised\_demand}(w) = \quad (2)$$
$$\left( \sum_{m_j \in Metrics} \sum_{t_j \in Times} \left( \text{Demand}(w, m_j, t_k) / \text{overall\_demand}(m_k) \right) \right)$$

Then, the workloads may be sorted by their normalized demand. In practice, when assigning clustered workloads, clusters may be considered in the order of the demand of their most demanding workloads, and then the workloads within a cluster may also be sorted locally.

Node Capacity

The capacity of a node i for a metric m at time t may be the original capacity of the node minus the resource usage of the workloads assigned to the node:

$$\text{node\_capacity}(n, m, t) = \quad (3)$$
$$\text{Capacity}(n, m) - \left( \sum_{w_i \in Assignment(n)} \text{Demand}(w_i, m, t) \right)$$

Fitting

A workload w may be added into a node n if there is capacity for all the metrics at all times.

$$\text{fits}(w, n) = \forall\, m \in Metrics \forall\, t \in Times \quad (4)$$
$$\text{Demand}(w, m, t) \leq \text{node\_capacity}(n, m, t)$$

A clustered workload isClustered from Table 1 may be database instances (workloads) that are siblings of each other as shown in FIG. 6. The node may be the number of nodes on which Wi is to be run, and w E ClusteredWorkload may be the set of workloads that need to be assigned to the target nodes discretely. A rule may be enforced where all Siblings must be packed into discrete target nodes before the cluster is said to be packed. If, at any point, one of the Siblings fails to pack into a discrete target node, then all siblings may be rolled back, and the resources may be released back to node_capacity.

Using techniques based on FFD and the definitions disclosed herein, the system 130 may place database workloads into a target cloud infrastructure (e.g., Oracle Cloud Infrastructure (OCI)) that supports clustered workflows. The system 130 may achieve savings in costs, both financial (pay-as-you-go) and to release resources back to the cloud pool for utilization elsewhere.

Workload Placement Algorithm

A high-level description is shown in Algorithm 1. One of the major challenges of workload placement in computing estates that have adopted clustered configurations may be accounting for clustered workflows that must be placed in their entirety or not at all. Identifying that the workload is clustered and on how many nodes may be key to placing the workload in the target cloud configuration.

Algorithm 1: FitWorkloads

```
    Input: Workloads (from Table 1)
    Nodes (from Table 1)
    Result: Assignment(n) (from Table 1)
    NotAssigned
1   Assignment(n) = θ for all n ∈ Nodes
2   NotAssigned = θ
3   foreach w ∈ Workloads ordered by normalised_demand
    (Equation 2) do
4   |   assigned = false
5   |   foreach n ∈ Nodes do
6   |   |   if isClustered(w_i) then
7   |   |   |   if w_i not already added to Assignment with
    |   |   |   cluster or included in NotAssigned then
8   |   |   |   |   assigned =
    |   |   |   |       FitClusteredWorkload(Siblings(w_i), Nodes
    |   |   |   └       Assignment, NotAsssigned)
9   |   |   |   if assigned then
10  |   |   |   └   break
    |   |   |
11  |   |   else if fits(w,n) then
12  |   |   |   Add w to Assignment(n)
13  |   |   |   assigned true
14  |   |   |   reduce node Capacity (Equation3) by
    |   |   |       Assignment
15  |   └   | break
16  |   if (not assigned) then
17  |   └   Add w to NotAssigned
    └
18  Report on Worldoads Assigned and NotAssigned and Nodes
    Capacity
```

Firstly, the system 130 may extract key information as inputs, ordering workloads by demand. Key configuration data may be stored in a central repository that stores whether a workload is clustered or not. If a workload is part of a cluster, then the system 130 may set a flag for that particular workload (represented by isClustered in Table 1), and the full set of workloads with which it is clustered may be obtained using Siblings in Table 1.

When placing workloads, if the workload w is from a single database instance, then the system 130 may check if the workload f its (Equation 5) into an available node, and if so, add it to Assignment for that node. The system 130 may report back to the user all workloads that have been fitted (by way of Assignment), and any that have not (by way of NotAssigned). If, however, the workload is clustered, system 130 may extract the related Sibling workloads in the cluster from a central repository; as the Oracle Enterprise Manager system and the OEM intelligent agent may be used to capture all performance and configuration data relating to the database instances. OEM may utilize a database schema to hold information relating to the workloads. Databases instances and this may be handled via a Global Unique Identifier (GUID).

Fitting Clustered Workloads

The fitting of clustered workloads may aim to enforce high availability by placing all workloads in a cluster before it can report back that the workloads are fitted. For example, if the clustered workload has three nodes with a database instance running on each node as described in FIG. 6, then it may place the workloads on discrete target nodes, or it will roll back what has already been placed (which may include reverting to a previous decision point in process flow, with appropriate notifications via the user interface in some embodiments). This is illustrated in Algorithm 2.

---

Algorithm 2: FitClusteredWorkload

---

```
    Input: ClusteredWorkload, including sibling data (from
              Algorithm 1)
    Nodes (from Table 1)
    Assignment(n) (from Table 1)
    NotAssigned (from Algorithm 1)
    Result: assigned
 1  foreach w ∈ ClusteredWorkload ordered by
    normalised_demand (Equation 2) do
 2  |    assigned = false
 3  |    if target nodes are <= source nodes then
 4  |    |    foreach n ∈ Nodes do
 5  |    |    |  if fits (w,n) then
 6  |    |    |    |    Add w to Assignment(n)
 7  |    |    |    |    assigned = true
 8  |    |    |    |    reduce node Capacity (Equation 3) by
    |    |    |    |       Assignment
 9  |    |    |  [   break
    |    |    [
10  |    |    if not assigned then
11  |    |    |  Remove all members of ClusteredWorkload from
    |    |    |     Assigned.
12  |    |    |  Add all members of ClusteredWorkload to
    |    |    |     NotAssigned
13  |    |    |  increase node Capacity (Equation 3) by
    |    |    |     Assignment
14  |    |    [  break
15  |    [   not enough nodes to fit
    [
16  Report on Worldoads Assigned and NotAssigned
17  return assigned
```

---

Firstly, the system may determine how many nodes make up the cluster (1, 2, . . . , N) nodes, which gives an indication of how many target nodes are required. When a clustered workload from three nodes cannot be fit into two target nodes, the system 130 may perform a test to ensure that the requisite number of target nodes are available. If there are not enough target nodes, then the system 130 may loop through all the workloads, ensuring that the siblings of the cluster are assigned to discrete target nodes. Each time an assignment takes place, the amount of resource of the target node may be reduced by the vector of the workload. Finally, the system 130 may report on what workloads are assigned to each target node.

Evaluating the Placement Once Fitted

Once the workloads from all database instances have been assigned and placed in their target nodes, each workload may be overlaid by the time frequency (hourly), allowing an understanding of the existing data signals (peaks and troughs) when the workloads are consolidated together. A simple groupby (2) per hour and per metric may show the newly consolidated data signal. In traditional bin-packing exercises, the max_value of a metric may be taken, and then bin-packing may be based on that value. However, if a peak is singular, for example, without pattern, then the prospect of over provisioning may become apparent. When the new trace is displayed over an X, Y (stacked), the consolidated workloads may exhibit their complex traits such as seasonality, trend, and shocks against the threshold limit of the bin. This approach may reveal and, where possible, perform or feed into further elicitation exercises that may be performed on the bin to fit the consolidated workloads more tightly.

Various embodiments may be configured to execute vector bin-packing utilizing the First-Fit Decreasing algorithm against databases that employ advanced technologies such as clustering and pluggable databases with a view to fitting a variety of workloads into complex target cloud configurations such as Oracle Cloud Infrastructure with a Bare Metal configuration. When placing workloads into cloud configurations because most cloud providers provision on multiple dimensions such as IOPS, storage, CPU and memory, a vector approach may be required. If the cloud consumer is also a cloud provider, then the vectors may be likely to increase in number, covering other areas of cloud technology, for example, network throughput, NIC bandwidth, or VNIC configuration to name but a few.

Once a workload migrates architectures, the signal of max_value of a metric that is associated with its workload over time may change, especially when analyzed in a time series format. Therefore, there may be a danger of over-provisioning if the max_value of a metric over a period of time is blindly accepted without determining whether there are repeating patterns or trends. What was provisioned to start with may not necessarily be needed once the workloads are placed, consolidated, and a cumulative signal is obtained from the target nodes.

While bin-packing is disclosed in some examples herein such as those that focus on First-Fit Decreasing (FFD) as the bin-packing technique, the workload placement features may be used with one or a combination of any of the following. A first-fit implementation may order items by descending size and then move along from the first bin until all bins are full. A worst-fit implementation may focus on the bin with the minimal load and try to fit the item. If the item can fit, it may be placed. Otherwise, the next bin may be evaluated as to whether the item will fit. A best-fit implementation may maintain a list of items and bins which are open. The bin with the maximum load may be determined. If the item can be placed, it may be placed. Otherwise, a new bin may be opened. A next-fit implementation may order items from largest to smallest opens the bin. If the item can fit, then it may be placed. Otherwise, the flow may move to the next bin until the item can fit. If it cannot fit, then it may not be placed. A refined-first-fit implementation may classify the bins into categories according to sizes and then may fit the items. This may involve assessing different sizes of bins and placing items. A harmonic implementation may order the items as 0, 1 and then pack the items into bins to an exact number into the minimum number of bins. A refined harmonic implementation may place items into bins based on ⅓ and may be designed to reduce wastage of items that are ½. That is, two items may go into a bin at ⅔ which is less wastage than ½. A modified harmonic implementation may be a derivative of the refined harmonic approach. Harmonic +1 and ++ implementations may be derivative of the modified harmonic and refined harmonic approaches. Almost-worst-fit implementations and other embodiments are possible.

Figure 13:
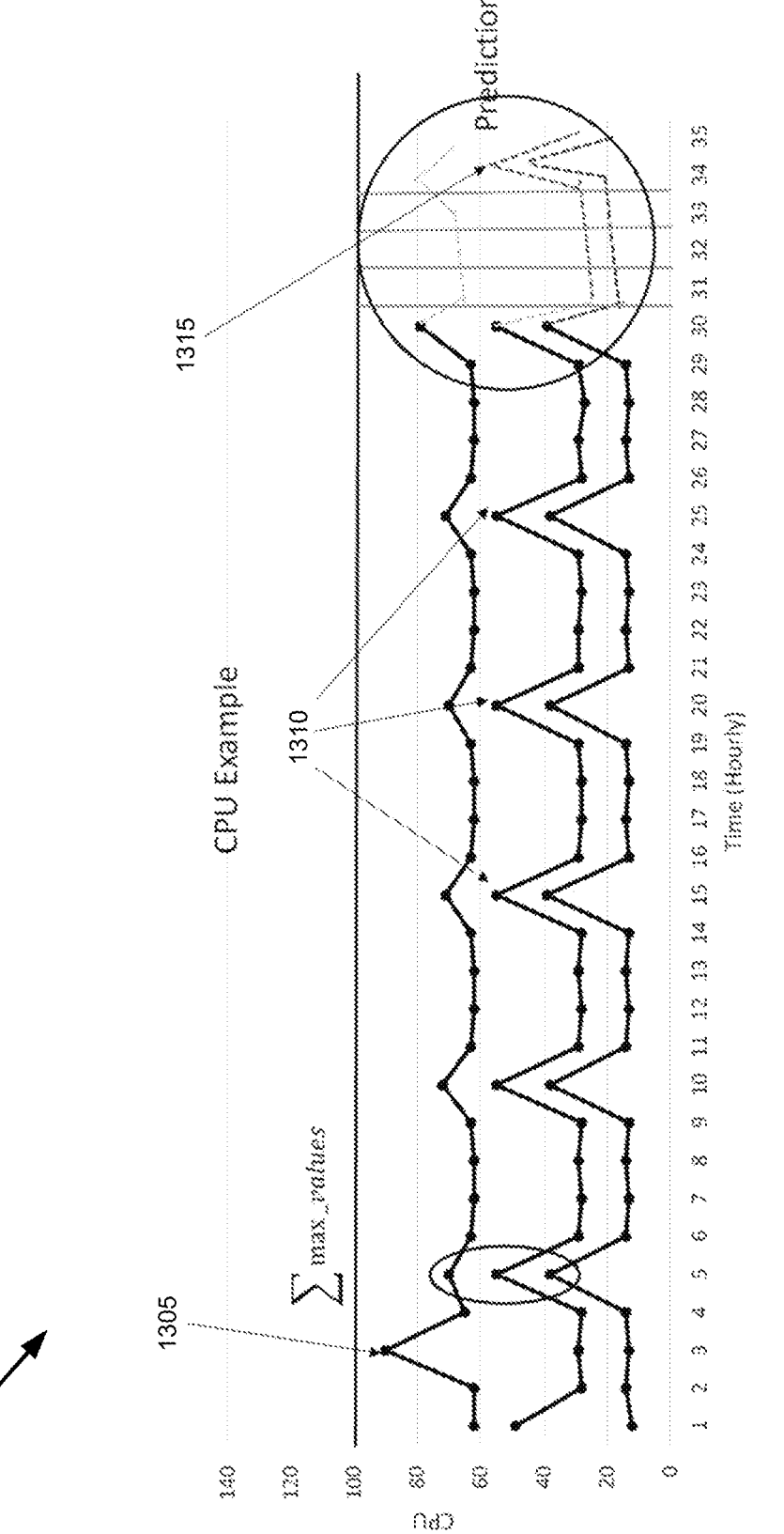
FIG. 13 illustrates another example of how the system determines aspects of workloads, in accordance with disclosed embodiments according to the present disclosure.

FIG. 13 illustrates another example of how the system 130 determines aspects of workloads, in accordance with disclosed embodiments according to the present disclosure. Illustrated is a CPU example with a plot 1300 of CPU utilization versus time, with three different workloads. As indicated by 1305, the system 130 may take the max_value from the whole signal and places the workload on that value.

Further, the system 130 may detect repeating patterns that would result in wastage, as indicated by 1310. As indicated by 1315, the system 130 may make predictions. The system 130 may determine the sum of the max values. Therefore, even though the workloads look like they fit, they may not fit when consolidated together and each of the time points (hourly) are measured correctly. While other bin-packing placement algorithms may take the max_value of a given number of observations (e.g., hourly), such may not be a repeating pattern, which means the probability of over-provisioning is very high.

Figure 14:
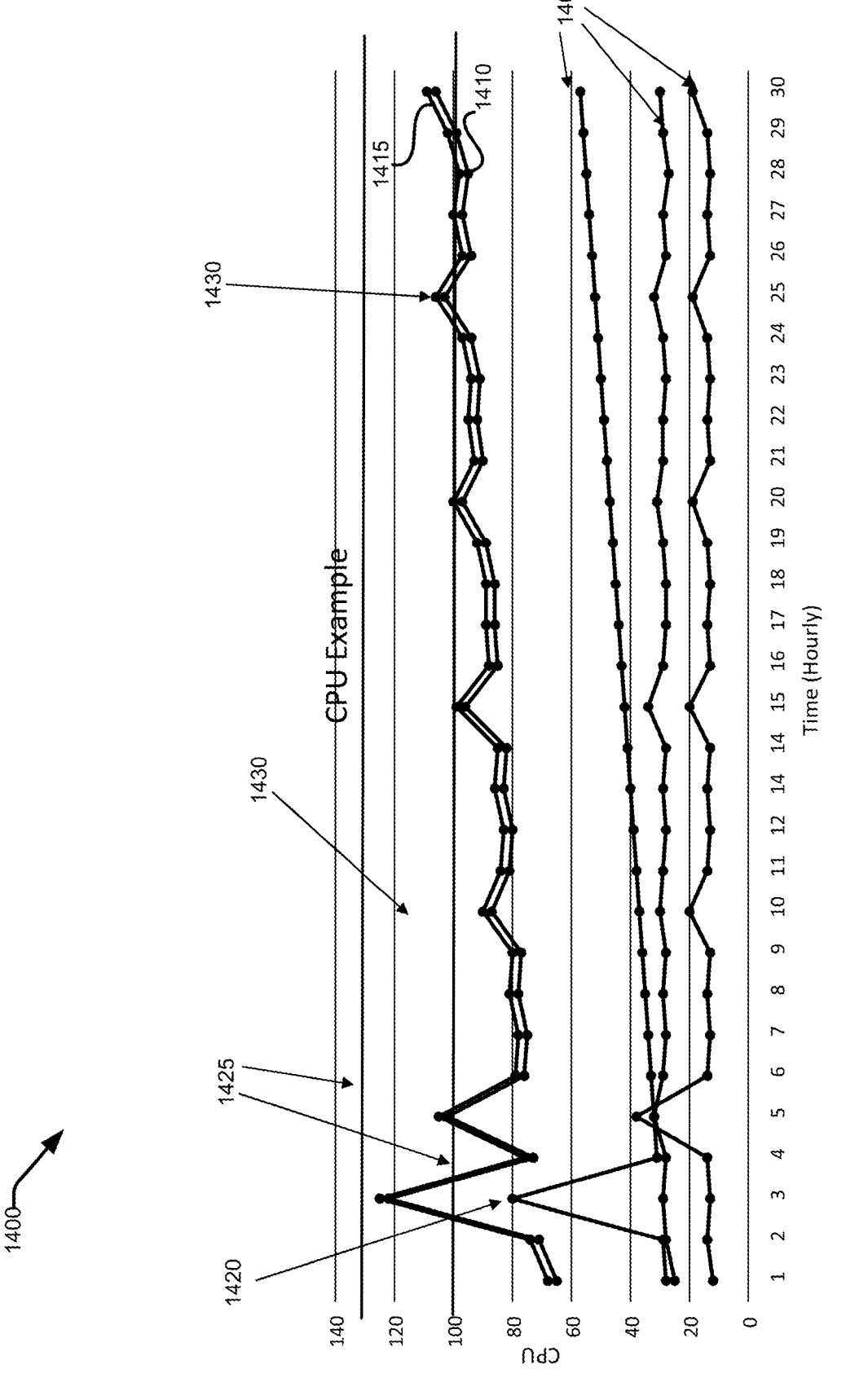
FIG. 14 illustrates an example of how the system analyzes consolidated temporal workloads, taking into account anomalies in the data, in accordance with disclosed embodiments according to the present disclosure.

FIG. 14 illustrates an example of how the system 130 analyzes consolidated temporal workloads, taking into account anomalies in the data, in accordance with disclosed embodiments according to the present disclosure. It is only when the system 130 more deeply analyzes the workload, that the system 130 can understand if a dynamic configuration is needed or if further elasticization is needed. Illustrated is a CPU example with a plot 1400 of CPU utilization versus time. As indicated by 1405, there may be three workloads with fairly low utilization. As indicated by 1410, a consolidated workload may consolidate all three workloads 1405. An elasticate is indicated by 1415. As indicated by 1420, the system 130 may detect an anomaly in the data that has skewed the placement algorithm. As indicated by 1425, the system 130 may raise the target nodes capacity from 100 CPU to 140 CPU for all workloads to fit. As indicated by 1430, the anomaly has caused the opportunity for wastage to occur because placement algorithms only take the max value from each workload. Thus, anything in between the consolidated line and the provision line is not used but provisioned for. As indicated by 1435, what is needed to elasticize around the consolidated signal of all workloads, once the signal is determined.

The system 130 may perform analyses of the consolidated time series data signal, including comparison with the sum of the target bin (node being of cloud configuration or otherwise) to ascertain if further efficiencies can be obtained by elasticization to reduce wastage in provision. The analyses may take into account an OLTP type with trend and seasonality workload, in order to identify provisioning that can be "squeezed" or elasticised to achieve further efficiencies. The sum of the workloads for a particular instance of a set of workload added together may exceed the sum of the bin. Bin packing algorithms may be orthogonal (statically independent) when placing vectors, placing based on what is given to place. So, the system 130 may perform a prediction (e.g., future capacity planning), then perform a placement design. Often, bin packing is done on the max value, but the max value may have occurred only once, with short, transitory spike (or, perhaps, a likewise small number of spikes unlikely to occur again). When provisioning is dictated by that one-time spike, the opportunity for wastage is very high. Such wastage situations are detected and eliminated by the system 130.

Given the popularity of high availability technology such as replication (standby databases), separation (pluggable database), or clustering to enforce SLAs and the absence of bin-packing algorithms that are able to account for clustered workloads, the system 130 may be configured to use a different FFD bin-packing algorithm. With the introduction of pluggable databases, a different approach, other than simply mapping a database instance as a 1-to-1 mapping to a VM, may be employed by the system 130. Consolidating the workloads together gives additional complexities to which the system 130 may adapt. For example, pluggable databases, while providing separation and agility by allowing the user to detach and attach a database more easily from one location to another, may be still attached to a global database memory structure that is consuming resources. By treating a pluggable as a single instance workload, complexity may be reduced within the algorithms of the system 130, which may allow placement of pluggable databases. A pluggable database may be assigned to a node, and a collection of pluggable databases may be assigned to a target node, as a clustered pluggable database may be shared across multiple target nodes. Therefore, the system 130 may be configured to use algorithms that may be multi-faceted in that they will place simple, complex, and very complex vectors attributed to any database workload regardless of the source database configurations.

By treating pluggable and standby databases as a single instance workload, the system 130 may perform workload placement without introducing further notation in the formulas. A standby database may usually be in recovery mode, applying all archive logs from all nodes in the primary cluster. Therefore, a standby may be a single instance which is more IO resource-intensive than memory or CPU.

Central Repository. The system 130 may be configured to provide a central repository. The system 130 may be configured to spin up and use an intelligent agent capable of Monitor-Analyze-Plan-Execute (MAPE) to identify, capture, and store metric and configuration data centrally, which allows the system 130 to align the time series data of the workloads uniformly. The intelligent agent may execute a command, for example, sar or iostat, at a particular time, with the command results being stored in a central repository within a database schema, for example, with one or more databases 114. The system 130 may perform aggregations on the metric data to an hourly value, and, while this has the negative effect of smoothing the signal (averaging the time points), it may allow comparison of the workloads at any given time period easier as shown in FIG. 11. FIG. 11 illustrates aspects of node resource capacity 1100, in accordance with disclosed embodiments according to the present disclosure. With the analyzing of the workloads centrally, the system 130 may identify the outputs, such as sar and iostat, of workloads from different machines much more easily, reducing the amount of data wrangling required in the application layer (e.g., by Python libraries, such as Pandas, Numpy, etc.).

Benchmarks. Comparing one CPU model with another is a challenge. The system 130 may use the benchmark SPECInt 2017 to compare the workload consuming CPU on one architecture to a workload being executed on another chip architecture. If a benchmark is not available, then the system 130 may select SPECInts from the nearest chip model above or below. The system 130 may store the SPECInts chip benchmarks in the central repository and may perform a calculation of 50% CPU used, which may equate to 50% of the SPECInts at peak. The system 130 may also utilize storage benchmarks based on Transaction Processing Performance Council benchmarks. However, RDBM systems may utilize complex memory algorithms that often bypass fetch operations of the database. For example, in Oracle Exadata technology, data that is commonly requested may be pinned into memory caches to aid database performance. There is also the added complexity of SANs, NASs), or cloud storage capabilities, such as block, file, or object storage, that may also utilize complex techniques where the database files are stored as mounted volumes therefore logical reads was taken as the metric. However, given that algorithms disclosed herein allow placement on metrics (i.e., vectors) that can be increased in number (i.e., are scalable), there is no reason why physical IOPS or a combination of a physical read and physical writes could not be used by the system 130. Placement on larger vectors with additional metrics may take place with embodiments disclosed herein.

Templates. The system 130 may use templates that allow user inputs, where a user chooses which metric or group of metrics that can be assigned to a vector from a workload either single, pluggable, or clustered database instance. This may facilitate the cloud service provider use case of placement of workloads on all facets of the cloud. Systems may be sensitive to a myriad of performance problems where bottlenecks appear in the network layer just as much as they do in CPU or Disk architectures. Therefore, allowing the user and/or system the ability to extend the vector by adding more metrics to be placed may be key. Systems behave differently from each other because the systems are asked to serve different functions within business silos. By utilizing templates, the system 130 may allow the algorithms the ability to extend the vectors.

Automation. With the manual approach of performing a workload placement exercise, technicians tend to adopt a spreadsheet approach when placing workloads into clouds. This approach can be cumbersome, for example, manually researching, converting the CPU (SPECint), IO speeds, and Memory between the source and target architectures, and creating the spreadsheet is time consuming. Often, these spreadsheets build in complexity and are bespoke to individual customers resulting in inflexibility, resulting in 'expert friendly' analysis that only the author understands. Disclosed embodiments of the system 130, however, may automate this process with the aim of reducing the level of effort technicians spend manually building spreadsheets, reducing errors from miscalculations that may occur in bespoke spreadsheets, and reducing the time to complete a placement plan from weeks/months to hours/days or less.

Embodiments of the system 130 executing disclosed algorithms may be effectively retrieving the configuration and performance data from a central repository. For example, extracting the CPU make, model, and its SPECInt value that is obtained by the intelligent agent therefore performing a comparison rather than manually researching this data, which is all but removed. Embodiments executing the algorithm may then quickly place and store the placement design of the workloads as a 'plan' in a normalized database schema, rather than having complex sets of bespoke spreadsheets. This may allow execution of the placement algorithms in minutes or less rather than days or weeks.

Accordingly, the system 130 may be configured to provide for accurate workload placement, especially when provisioning services such as IaaS, PaaS, DbaaS, or SaaS, whether that is on-premise, remote, or hybrid clouds. However, system-selection of the best algorithm or collection of placement algorithms to use is key, as a standard approach or an off-the-shelf technique is problematic when advanced workload configurations such as clustering are employed. With the First-Fit Decreasing bin-packing method on advanced databases architectures, such as clustering and pluggables, disclosed embodiments of the system 130 may extend the FFD algorithm to accommodate sibling workloads within the cluster, especially when the cluster is consuming resources unevenly. Accounting for siblings when ordering clustered workloads, the system 130 may order workloads and their siblings. This is to account for the siblings in a cluster that consume resources unevenly. When clustered instance workloads are listed individually, one workload within a cluster may be located considerably down the pecking order compared to its sibling if a simple ordering exercise takes place. Eventually, the target nodes are exhausted of their resources and placement ceases. If the target node runs out of available resources before the sibling is placed, then a rolling back exercise may be performed by the system 130. Therefore, it may be critical to order on the cluster and its siblings in descending order. Other protocols may be employed by the system 130 and may include a cumulative approach of the total amount of resources consumed per cluster and ordering based on number of nodes then resources consumed. Additionally, a user-defined priority assignment function may be facilitated by the system 130. Assigning a user-defined priority to a workload may allow for separation between live systems, as some systems may be more critical than others. The system 130 may leverage machine learning (supervised) coupled with time series analysis to predict future resource consumption of a workload in combination with placement, which may further facilitate the system 130 determining what systems can be placed based on their future resource consumption.

Figure 15:
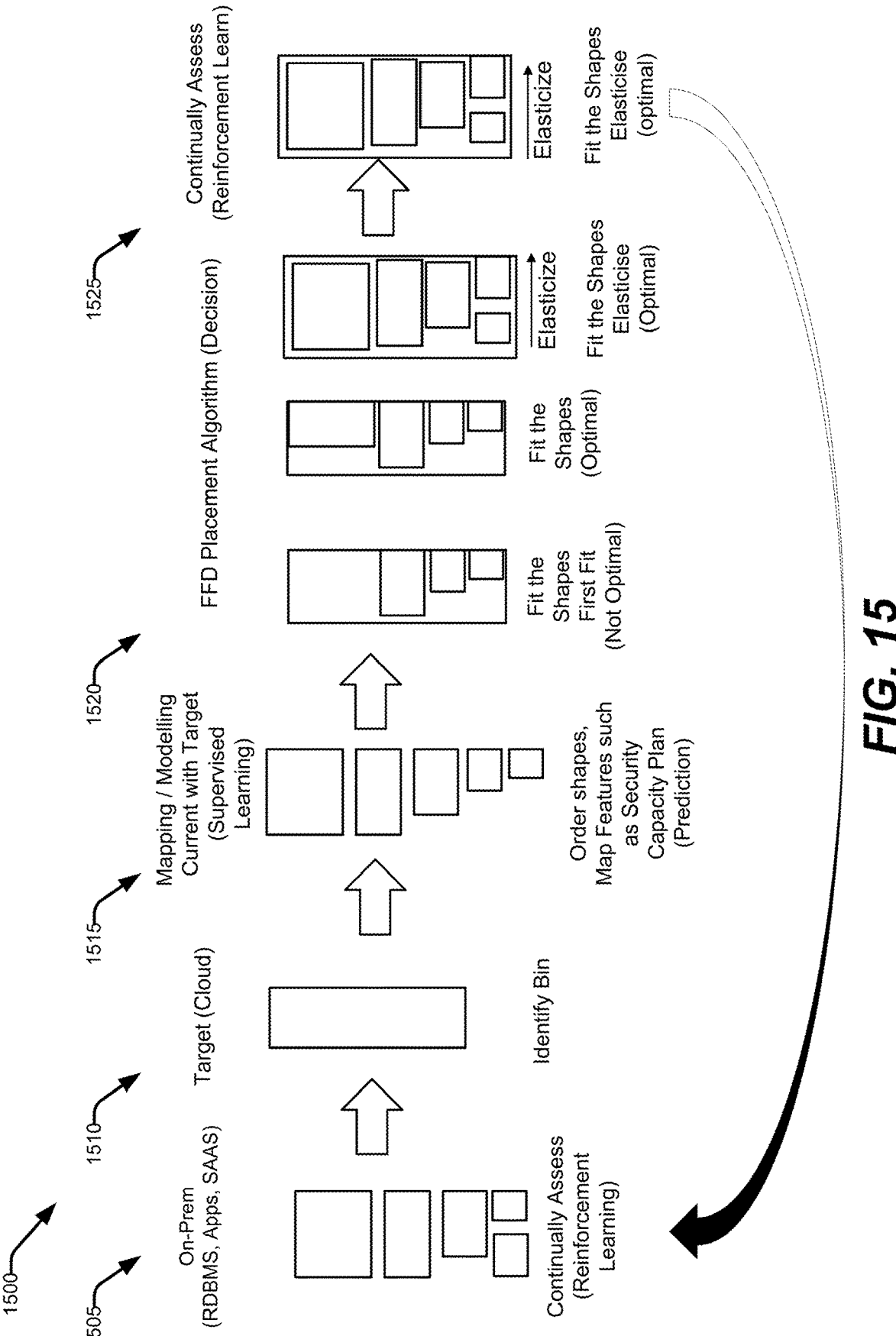
FIG. 15 depicts an example method to facilitate migration of data and/or applications from one or more source systems to one or more target systems, in accordance with disclosed embodiments according to the present disclosure.

FIG. 15 depicts an example method 1500 to facilitate migration of data and/or applications from one or more source systems to one or more target systems, in accordance with disclosed embodiments according to the present disclosure. The method 1500 should be understood as representing some, but not all, aspects of the methods and operations disclosed above. Teachings of the present disclosure may be implemented in a variety of configurations. As such, the order of the steps comprising the method 1500 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

The method 1500 may illustrate example services provided by the system 130, including discovery, capacity planning, modeling, and decision services, to place workloads of one or more source systems in a migration of data and/or applications from the one or more source systems to one or more target systems. The method 1500 may include planning placement of workloads of one or more source systems in the one or more target systems to facilitate the migration. The method 1500 may incorporate machine learning and artificial intelligence model workloads, plan placement of the workloads on target systems, predict bin placement and corresponding workloads, and or create placement specifications to pack a clustered environment.

As indicated by block 1505, the system 130 may perform source discovery operations. The source discovery operations may be facilitated by migration setup operations, collection and/or analysis agents deployed on the source system and configured to facilitate discovery operations, a gateway configured to facilitate discovery operations, and/or the like, as disclosed herein. Accordingly, the system 130 may receive data relating to a first number of source nodes. The source discovery operations may include the system 130 discovering attributes of on-prem workloads. The system 130 may determine one or more workload types (e.g., database, RDBMS, apps, SaaS, and/or the like). The source discovery operations may include the system 130 determining workload features (e.g., architectures, RAC, pluggable, and/or the like). The system 130 may increase efficiency and accuracy of the provisioning tasks using bin packing algorithms. In performing data gathering, the system 130 may use automated collectors/agents (e.g., extraction, transformation, and loading (ETL) of EM and AWR, and/or the like), collect key metrics, and securely transport data.

As indicated by block 1510, the system 130 may perform target discovery operations. The target discovery operations may be facilitated by migration setup operations, analysis of the data collected by the source discovery operations, and/or system 130 determinations about the requirements of the one or more source systems. Accordingly, the system 130 may receive data relating to a second number of target nodes. The target discovery operations may include the system 130 determining OCI target bins. The system 130 may identify one or more bins into which the system 130 may fit the workloads.

As indicated by block 1515, the system 130 may use machine learning and artificial intelligence to perform mapping and modeling to migrate the source (i.e., current) workloads to the target. In performing data analyses, the processes of the system 130 may be automated for each layer for the stack, may include machine learning to predict future resource consumption, and may include continued analyses with repeatable processes to track progress as workloads migrate. The system 130 may use machine learning to predict bins and bin packing as the consolidation is executed.

The system 130 may perform capacity planning. To do so, the system 130 may use machine learning to analyze resource consumption of on-prem workloads and workload metrics and make predictions for future usage based at least in part on the analyze resource consumption. The system 130 may use basic workloads consisting of resources (CPU, memory, storage/IOPS) taken from the max values over a period of time. The system 130 may consider the sum of the bin and its capacity. Then, the system 130 may order the shapes based on size/requirements and/or priority. In designing the new landscape, the system 130 may facilitate automated UIs continuously updated for the duration of the service.

The system 130 may generate feature mapping configurations to map features of the one or more sources to the one or more targets. Such operations may facilitate or be included in the creation of a placement plan. The mapping technologies of the system 130 may include automated lookups, automated mapping, and the bin packing algorithms to ensure the correct workloads are met together in the correct target configurations. The system 130 may perform modeling to facilitate bin packing. This may include creating bin packing specifications to specify fittings of the workloads. The system 130 may determine the best model to fit the workloads together in OCI. Such operations may include or be based at least in part on mapping the source features to the target. Accordingly, the system 130 may analyze the data relating to the first number of source nodes and the second number of target nodes, and may create a migration plan that specifies placement of workloads from one or more source systems into one or more target systems.

Figures 16A, 16B:
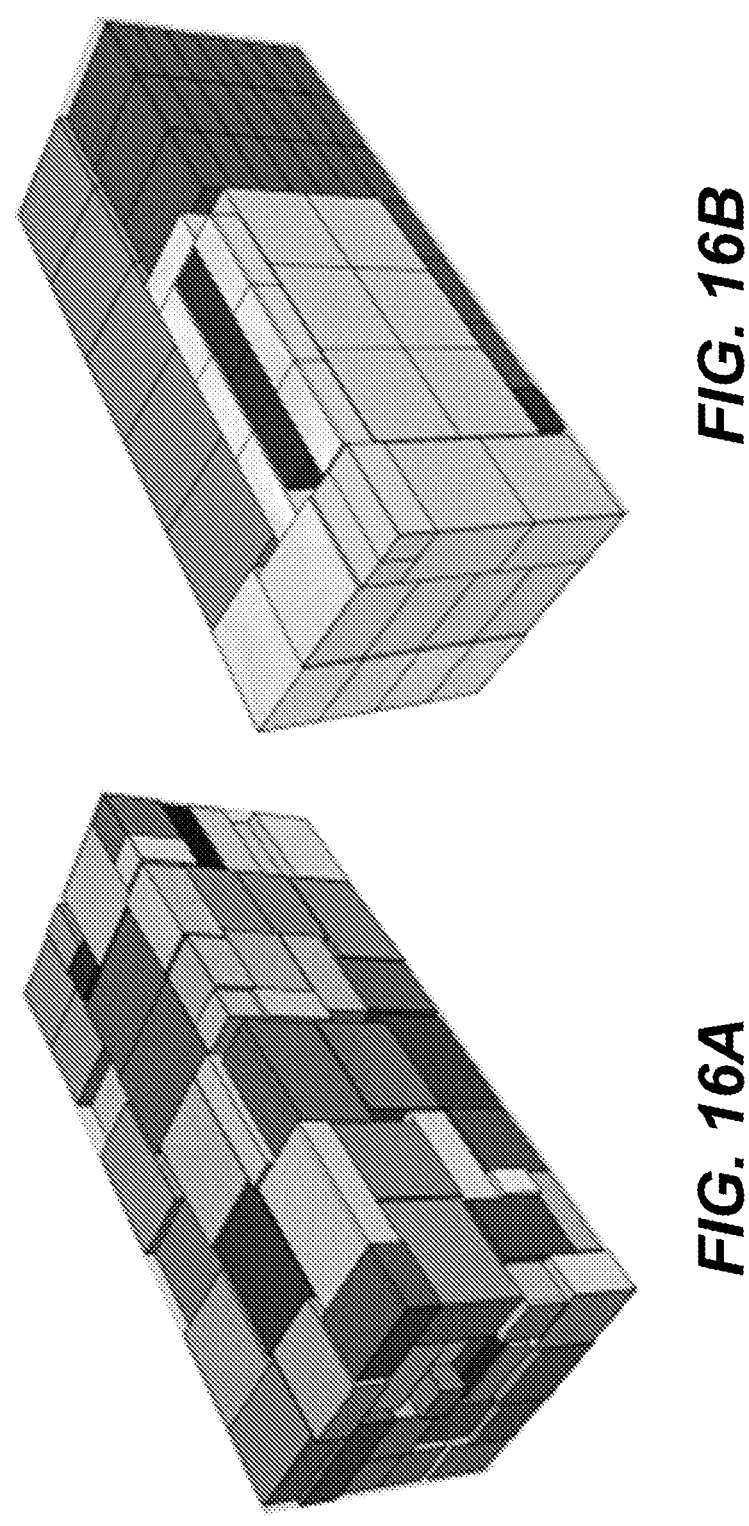
FIG. 16A illustrates some aspects of example consolidation and bin packing workloads into the target bin according to first fit, in accordance with disclosed embodiments according to the present disclosure.
FIG. 16B illustrates some aspects of example consolidation and bin packing workloads into the target bin according to optimal fit, in accordance with disclosed embodiments according to the present disclosure.

As indicated by block 1520, the system 130 may fit the shapes to the correct target bin based on size and priority applicable to the shapes available and according to first fit, optimal, and/or elasticization. FIG. 16A illustrates some aspects of example consolidation and bin packing workloads into the target bin according to first fit, in accordance with disclosed embodiments according to the present disclosure. FIG. 16B illustrates some aspects of example consolidation and bin packing workloads into the target bin according to optimal fit. If the bin is not big enough, the system 103 may elasticize the provisioning to accommodate the workloads. The system 130 may generate reports on the optimal bins based on priority, workload traits, features, monetary reports of elasticizing versus provisioning, wastage eliminated by the optimal fitting, and/or the like, which the system 130 may communicate via the UIs and/or via network transmissions to one or more endpoint devices.

The system 130 may execute the migration according to the migration plan. The placement may include packing a pluggable environment or a clustered environment. As disclosed herein with respect to the workload placement algorithm and fitting clustered workloads, the system 130 may utilize a workload placement algorithm that may include performing a test. Pluggable databases offer a degree of separation like a clustered environment, and embodiments disclosed herein may be configured to handle clustered and pluggable complex environments because, as disclosed above, they treat the sibling workload as an instance. The system 130 may be configured to intelligently provision not only the smallest provisioning for an individual workload, but also, when there are multiple siblings, the system 130 may be configured to place the sibling workloads together. This may be an improvement over conventional approaches that are only able to provision for placement of the biggest workload and only one workload at a time, which results in a lot of wastage between each sibling workload where the sibling workloads are related to each other. Accordingly, disclosed embodiments may reduce the wastage and handle such related workloads, as disclosed in detail above.

When the number of target nodes is greater than the number of source nodes, workload may be placed from the source nodes to the target nodes. When the number of target nodes is less than the number of source nodes, the workload from the source nodes is not placed to the target nodes, and one or more rollback operations may be executed. This may ensure that the system 130 keeps its design for key attributes such as Quality of Service (Certain nodes may be a given a priority over another) and SLAs. The SLAs may correspond to certain nodes that may be switched off to less critical parts of the "whole" system. Accordingly, the migration may include placing the workload from the source nodes to the target nodes when the number of target nodes is greater than the number of source nodes.

Moreover, as disclosed herein, the migration operations, including the placement of workloads from the one or more source systems to one or more target systems may be scalable so that the placement of the workloads is based at least in part on one or more dimensions that can increase a vector. The vector may include dimensions of metrics that correspond to one or more IO metrics, CPU metrics, memory metrics, and/or the like, and may be a function of time. The system 130 may obtain a consolidated time series data signal corresponding to the workloads. The system 130 may analyze the consolidated time series data signal and comparing the consolidated time series data signal with a sum of a target bin to determine whether further efficiencies can be obtained by elasticization to reduce wastage, and, if so, the system 130 may elasticize the target bin.

As indicated by block 1525, the system 130 may continually assess the migration with reinforcement learning, as the migration continues and after one or more portions/stages of the migration are completed. Process flow may cycle back to 1505, for example. The system 130 may adapt to temporal complexities at least in part by adding an element of time as being the time each shape is required. As the workloads are migrated into a target, they will likely change, and thus continuous modelling operations, including machine reinforcement learning (MRL), may be performed by the system 130 to ensure the best consolidation.

In performing recursive analyses, the system 130 may utilize reinforcement learning and AI and ML continuous evaluations (e.g., MDP) as workloads move, to ensure confidence in the configuration and to adjust the target cloud if required.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms "computer-readable medium," "computer-readable media," "processor-readable medium," "processor-readable media," "machine-readable medium," and "machine-readable media," include, but are not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to place workloads of one or more source systems in a migration of data and/or applications from the one or more source systems to one or more target systems, the system comprising:

one or more processing devices and memory communicatively coupled with and readable by the one or more processing devices, the memory comprising processor-readable instructions which, when executed by the one or more processing devices, cause the one or more processing devices to perform operations comprising:

receiving data relating to a first number of source nodes and a second number of target nodes;

analyzing the data relating to the first number of source nodes and the second number of target nodes;

determining future resource consumption of workloads based on machine learning and a time-series data signal;

creating a migration plan that specifies placement of the workloads from the one or more source systems into the one or more target systems based on the future resource consumption, where:

the placement comprises packing a pluggable environment or a clustered environment, where the packing the pluggable environment or the clustered environment comprises:

when the second number of target nodes is greater than the first number of source nodes, placing a workload from the source nodes to the target nodes;

when the second number of target nodes is less than the first number of source nodes, the workload from the source nodes is not placed to the target nodes, and one or more rollback operations are executed;

causing execution of the migration according to the migration plan, the migration comprising placing the workload from the source nodes to the target nodes when the second number of target nodes is greater than the first number of source nodes;

consolidating the workloads based on the placement of the workloads into the target nodes;

identifying one or more target bins and bin packing using the machine learning while the workloads are consolidated, wherein a target bin of the one or more target bins corresponds to a node of a cloud configuration, and the bin packing specifies fittings of the workloads into the one or more target bins; and placing the workloads into the identified one or more target bins.

2. The system to place workloads of one or more source systems in a migration of data and/or applications from the one or more source systems to one or more target systems as recited in claim 1, where the one or more target systems correspond to a cloud infrastructure, and the placement of the workloads corresponds to placing the workloads in the cloud infrastructure.

3. The system to place workloads of one or more source systems in a migration of data and/or applications from the one or more source systems to one or more target systems as recited in claim 2, where the operations are scalable so that the placement of the workloads is based at least in part on one or more dimensions that can increase a vector.

4. The system to place workloads of one or more source systems in a migration of data and/or applications from the one or more source systems to one or more target systems as recited in claim 3, where the vector comprises dimensions of metrics that correspond to one or more of an input/output (IO) metric, a central processing unit (CPU) metric, and/or a memory metric.

5. The system to place workloads of one or more source systems in a migration of data and/or applications from the one or more source systems to one or more target systems as recited in claim 4, where the vector is a function of time.

6. The system to place workloads of one or more source systems in a migration of data and/or applications from the one or more source systems to one or more target systems as recited in claim 5, the operations further comprising:

obtaining a consolidated time series data signal corresponding to the workloads; and analyzing the consolidated time series data signal and comparing the consolidated time series data signal with a sum of the target bin to determine whether further efficiencies can be obtained by elasticization to reduce wastage.

7. The system to place workloads of one or more source systems in a migration of data and/or applications from the one or more source systems to one or more target systems as recited in claim 6, the operations further comprising:

elasticizing the target bin.

8. The system to place workloads of one or more source systems in a migration of data and/or applications from the one or more source systems to one or more target systems as recited in claim 7, where a migration service configured to perform the migration of data and/or applications is cloud-based.

9. A method to place workloads of one or more source systems in a migration of data and/or applications from the one or more source systems to one or more target systems, the method comprising:

receiving, by a migration infrastructure, data relating to a first number of source nodes and a second number of target nodes, where the migration infrastructure is located remotely from the first number of source nodes and is configured to provide a migration service;

analyzing, by the migration infrastructure, the data relating to the first number of source nodes and the second number of target nodes;

determining future resource consumption of workloads based on machine learning and a time-series data signal;

creating a migration plan that specifies placement of the workloads from the one or more source systems into the one or more target systems based on the future resource consumption, where:

the placement comprises packing a pluggable environment or a clustered environment, where the packing the pluggable environment or the clustered environment comprises:

when the second number of target nodes is greater than the first number of source nodes, placing a workload from the source nodes to the target nodes;

when the second number of target nodes is less than the first number of source nodes, the workload from the source nodes is not placed to the target nodes, and one or more rollback operations are executed;

causing, by the migration infrastructure, execution of the migration according to the migration plan, the migration comprising placing the workload from the source nodes to the target nodes when the second number of target nodes is greater than the first number of source nodes;

consolidating the workloads based on the placement of the workloads into the target nodes;

identifying one or more target bins and bin packing using the machine learning while the workloads are consolidated, wherein a target bin of the one or more target bins corresponds to a node of a cloud configuration, and the bin packing specifies fittings of the workloads into the one or more target bins; and placing the workloads into the identified one or more target bins.

10. The method to place workloads of one or more source systems in a migration of data and/or applications from the one or more source systems to one or more target systems as recited in claim 9, where the one or more target systems correspond to a cloud infrastructure, and the placement of the workloads corresponds to placing the workloads in the cloud infrastructure.

11. The method to place workloads of one or more source systems in a migration of data and/or applications from the one or more source systems to one or more target systems as recited in claim 10, where the method is scalable so that the placement of the workloads is based at least in part on one or more dimensions that can increase a vector.

12. The method to place workloads of one or more source systems in a migration of data and/or applications from the one or more source systems to one or more target systems as recited in claim 11, where the vector comprises dimensions of metrics that correspond to one or more of an input/output (IO) metric, a central processing unit (CPU) metric, and/or a memory metric.

13. The method to place workloads of one or more source systems in a migration of data and/or applications from the one or more source systems to one or more target systems as recited in claim 12, where the vector is a function of time.

14. The method to place workloads of one or more source systems in a migration of data and/or applications from the one or more source systems to one or more target systems as recited in claim 13, the method further comprising:

obtaining a consolidated time series data signal corresponding to the workloads; and analyzing the consolidated time series data signal and comparing the consolidated time series data signal with a sum of the target bin to determine whether further efficiencies can be obtained by elasticization to reduce wastage.

15. The method to place workloads of one or more source systems in a migration of data and/or applications from the one or more source systems to one or more target systems as recited in claim 14, the method further comprising:

elasticizing the target bin.

16. The method to place workloads of one or more source systems in a migration of data and/or applications from the one or more source systems to one or more target systems as recited in claim 15, where the migration service is cloud-based.

17. One or more non-transitory, machine-readable media having machine-readable instructions thereon which, when executed by one or more processing devices, cause the one or more processing devices to perform operations comprising:

receiving data relating to a first number of source nodes and a second number of target nodes;

analyzing the data relating to the first number of source nodes and the second number of target nodes;

determining future resource consumption of workloads based on machine learning and a time-series data signal;

creating a migration plan that specifies placement of the workloads from one or more source systems into one or more target systems based on the future resource consumption, where:

the placement comprises packing a pluggable environment or a clustered environment, where the packing the pluggable environment or the clustered environment comprises:

when the second number of target nodes is greater than the first number of source nodes, placing a workload from the source nodes to the target nodes;

when the second number of target nodes is less than the first number of source nodes, the workload from the source nodes is not placed to the target nodes, and one or more rollback operations are executed; and causing execution of a migration according to the migration plan, the migration comprising placing the workload from the source nodes to the target nodes when the second number of target nodes is greater than the first number of source nodes;

consolidating the workloads based on the placement of the workloads into the target nodes;

identifying one or more target bins and bin packing using the machine learning while the workloads are consolidated, wherein a target bin of the one or more target bins corresponds to a node of a cloud configuration, and the bin packing specifies fittings of the workloads into the one or more target bins; and placing the workloads into the identified one or more target bins.

18. The one or more non-transitory, machine-readable media as recited in claim 17, where the one or more target systems correspond to a cloud infrastructure, and the placement of the workloads corresponds to placing the workloads in the cloud infrastructure.

19. The one or more non-transitory, machine-readable media as recited in claim 18, where the set of operations is scalable so that the placement of the workloads is based at least in part on one or more dimensions that can increase a vector.

20. The one or more non-transitory, machine-readable media as recited in claim 19, where the vector comprises dimensions of metrics that correspond to one or more of an input/output (IO) metric, a central processing unit (CPU) metric, and/or a memory metric.

\* \* \* \* \*